US006584770B2

(12) United States Patent
Tsuruga et al.

(10) Patent No.: US 6,584,770 B2
(45) Date of Patent: Jul. 1, 2003

(54) HYDRAULIC DRIVE SYSTEM

(75) Inventors: Yasutaka Tsuruga, Moriyama (JP); Takashi Kanai, Kashiwa (JP); Junya Kawamoto, Moriyama (JP); Satoshi Hamamoto, Toyama-ken (JP); Yasuharu Okazaki, Takaoka (JP); Yukiaki Nagao, Toyama (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 352 days.

(21) Appl. No.: 09/936,283

(22) PCT Filed: Jan. 10, 2001

(86) PCT No.: PCT/JP01/00057

§ 371 (c)(1), (2), (4) Date: Sep. 12, 2001

(87) PCT Pub. No.: WO01/51820

PCT Pub. Date: Jul. 19, 2001

(65) Prior Publication Data

US 2002/0157389 A1 Oct. 31, 2002

(30) Foreign Application Priority Data

Jan. 12, 2000 (JP) ....................................... 2000-004074

(51) Int. Cl.[7] ................................................ F16D 31/02
(52) U.S. Cl. ............................................ 60/422; 60/452
(58) Field of Search ..................... 60/452, 422; 91/446, 91/447

(56) References Cited

U.S. PATENT DOCUMENTS 5,186,000 A 2/1993 Hirata et al.
5,289,679 A * 3/1994 Yasuda ......................... 60/422
5,307,631 A * 5/1994 Tatsumi et al. ............... 60/452
5,950,429 A * 9/1999 Hamkins ...................... 60/422
6,192,681 B1 * 2/2001 Tsuruga et al. ............... 60/452

FOREIGN PATENT DOCUMENTS

| | | |
|---|---|---|
| EP | 0 326 150 A1 | 8/1989 |
| EP | 877 168 | 11/1998 |
| EP | 0 877 168 A1 | 11/1998 |
| GB | 2195745 | 4/1988 |
| JP | 60-11706 | 1/1985 |
| JP | 4-119205 | 4/1992 |
| JP | 10-196604 | 7/1998 |
| JP | 10-205501 | 8/1998 |
| WO | WO/98022717 | 5/1998 |

* cited by examiner

*Primary Examiner*—Edward K. Look
*Assistant Examiner*—Igor Kershteyn
(74) *Attorney, Agent, or Firm*—Mattingly, Stanger, Malur, P.C.

(57) ABSTRACT

In a hydraulic drive system in which a target compensated differential pressure for each of pressure compensating valves 21*a*, 21*b* is set in accordance with a differential pressure between a pump delivery pressure and a maximum load pressure, and a target LS differential pressure is set as a variable value depending on a revolution speed of an engine 1, a fixed throttle 32 and a signal pressure variable relief valve 33 are disposed in a maximum load pressure line 35. A relief setting pressure $P_{LMAXO}$ of the signal pressure variable relief valve 33 is set so as to satisfy $P_{LMAXO}=P_R-P_{GR}+a$ (where a is a value smaller than $P_{GR}$) with respect to a target LS differential pressure $P_{GR}$ and a setting pressure $P_R$ of the main relief valve 30.

6 Claims, 16 Drawing Sheets

OVERRIDE CHARACTERISTICS
OF VARIABLE RELIEF VALVE

PROBLEM WITH COMPARATIVE EXAMPLE 1

OPERATION OF COMPARATIVE EXAMPLE 2
(OPERATION OF COMPARATIVE EXAMPLE 3
AT RATING OF ENGINE)

OPERATION OF COMPARATIVE EXAMPLE 3
(AT LOW ENGINE REVOLUTION SPEED)

OPERATION OF FIRST EMBODIMENT
(AT RATING OF ENGINE)

OPERATION OF FIRST EMBODIMENT
(AT LOW ENGINE REVOLUTION SPEED)

OPERATION OF SECOND EMBODIMENT
(AT RATING OF ENGINE)

OPERATION OF SECOND EMBODIMENT
(AT LOW ENGINE REVOLUTION SPEED)

HYDRAULIC DRIVE SYSTEM

TECHNICAL FIELD

The present invention relates to a hydraulic drive system for a construction machine, such as a hydraulic excavator, in which load sensing control is performed to hold a delivery pressure of a hydraulic pump higher than a maximum load pressure of a plurality of actuators by a target differential pressure, and in which differential pressures across a plurality of directional control valves are each controlled by a pressure compensating valve. More particularly, the present invention relates to a hydraulic drive system in which a target compensated differential pressure of each pressure compensating valve is set by a differential pressure between the delivery pressure of the hydraulic pump and the maximum load pressure of the plurality of actuators, and the target differential pressure in the load sensing control is variably set depending on an engine revolution speed.

BACKGROUND ART

A hydraulic drive system, in which load sensing control is performed to hold a delivery pressure of a hydraulic pump higher than a maximum load pressure of a plurality of actuators by a target differential pressure, is called a load sensing system (hereinafter referred to also as an "LS system"). Usually, in the LS system, differential pressures across a plurality of directional control valves are each controlled by a pressure compensating valve so that a hydraulic fluid can be supplied to the actuators at a ratio depending on opening areas of the directional control valves regardless of the magnitude of load pressure during the combined operation in which the plurality of actuators are simultaneously driven.

In connection with such an LS system, JP,A 10-196604 discloses a hydraulic drive system in which a differential pressure (hereinafter referred to as an "LS differential pressure") between a delivery pressure of a hydraulic pump and a maximum load pressure of a plurality of actuators is introduced to pressure compensating valves for setting a target compensated differential pressure of each pressure compensating valve by the LS differential pressure, and in which a target differential pressure (hereinafter referred to as a "target LS differential pressure") in the load sensing control is variably set depending on an engine revolution speed.

By setting the target compensated differential pressure of each pressure compensating valve by the LS differential pressure, when a saturation state, where a delivery rate of the hydraulic pump is insufficient for satisfying a flow rate demanded by the plurality of directional control valves, occurs during the combined operation in which the plurality of actrators are simultaneously driven, the LS differential pressure is lowered depending on a degree of saturation, and the target compensated differential pressure of each pressure compensating valve is also reduced correspondingly. Therefore, the delivery rate of the hydraulic pump can be redistributed at a ratio of flow rates demanded by the respective actuators. Such a system is based on the concept of the invention disclosed in JP,A 60-11706.

By variably setting the target LS differential pressure depending on the engine revolution speed, when the engine revolution speed is lowered, the target LS differential pressure is also reduced correspondingly. Accordingly, even when a control lever for the directional control valve is operated in the same input amount as in the rated state, the flow rate of the hydraulic fluid supplied to the actuator is reduced and the actuator speed is slowed down. As a result, the actuator speed can be obtained corresponding to the engine revolution speed and fine operability can be improved.

Further, in connection with the LS system, GB2195745A discloses a system in which a signal pressure relief valve is disposed in a maximum load pressure line for detecting a maximum load pressure as a signal pressure, a setting pressure of the signal pressure relief valve is set to be lower than a setting pressure of a main relief valve, and the maximum load pressure having an upper limit restricted by the signal pressure relief valve is introduced to each pressure compensating valve. By providing the signal pressure relief valve in the maximum load pressure line, even when a load pressure of any one actuator reaches the setting pressure of the main relief valve and a delivery pressure of a hydraulic pump becomes equal to the maximum load pressure during the combined operation in which a plurality of actuators are simultaneously driven, it is possible to prevent all of the pressures compensating valves from being fully closed and hence prevent all of the actuators from being stopped, because the signal pressure in the maximum load pressure line is reduced to a level lower than the delivery pressure of the hydraulic pump.

DISCLOSURE OF THE INVENTION

However, the prior-art systems described above have problems as follows.

In the prior art disclosed in JP,A 10-196604, as described above, the LS differential pressure is introduced as the target compensated differential pressure to the pressure compensating valve. During the combined operation in which a plurality of actuators are simultaneously driven, therefore, when the load pressure of any one actuator reaches the setting pressure of the main relief valve and the delivery pressure of the hydraulic pump becomes equal to the maximum load pressure, the LS differential pressure is reduced to 0 and the pressure compensating valves are all fully closed. Consequently, no hydraulic fluid is supplied to the other actuators as well, of which load pressures do not yet reach the relief pressure, and the actuators are all stopped.

By providing the signal pressure relief valve, disclosed in GB2195745A, in the maximum load pressure line of the hydraulic drive system disclosed in JP,A 10-196604, even when the delivery pressure of the hydraulic pump becomes equal to the maximum load pressure as mentioned above, the signal pressure in the detection line is reduced to a level lower than the delivery pressure of the hydraulic pump. It is hence possible to prevent all of the pressure compensating valves from being fully closed and prevent all of the actuators from being stopped. Such an arrangement, however, causes another problem.

In the hydraulic drive system disclosed in JP,A 10-196604, the target LS differential pressure is variably set depending on the engine revolution speed. Therefore, the target LS differential pressure differs between when the engine revolution speed is set to a rated value and when the engine revolution speed is set to a lower value. The target LS differential pressure is smaller in the latter case than in the former case, and the actual LS differential pressure is also reduced correspondingly. Accordingly, if the setting pressure of the signal pressure relief valve is set to be lower than the setting pressure of the main relief valve by a value corresponding to the LS differential pressure during the rated rotation, the following problem occurs. During the rated rotation, the LS differential pressure resulting when the load pressure of the actuator is low and the main relief valve is not operated is equal to the differential pressure between the delivery pressure of the hydraulic pump and the signal pressure in the detection line resulting when the load pressure rises up to the setting pressure of the main relief valve, and hence the target compensated differential pressure of the pressure compensating valve is not changed. However, when the engine revolution speed is set to a lower value, the LS differential pressure is reduced to a level lower than that during the rated rotation as described above, while the differential pressure between the setting pressure of the signal pressure relief valve and the setting pressure of the main relief valve remains the same as the LS differential pressure during the rated rotation. Accordingly, the differential pressure between the delivery pressure of the hydraulic pump and the signal pressure in the detection line resulting when the load pressure rises up to the setting pressure of the main relief valve is larger than the LS differential pressure resulting when the load pressure of the actuator is low and the main relief valve is not operated, whereby the target compensated differential pressure introduced to the pressure compensating valve is increased. As a result, when the load pressure of any one actuator reaches the setting pressure of the main relief valve during the combined operation in which a plurality of actuators are simultaneously driven, the hydraulic fluid is supplied to the other actuators at a larger flow rate than so far, and the other actuators are sped up. Operability in the combined operation is hence remarkably impaired.

A first object of the present invention is to provide a hydraulic drive system wherein, even when a load pressure of any one actuator reaches a setting pressure of a main relief valve during the combined operation in which a plurality of actuators are simultaneously driven, the other actuators are not stopped and good operability in the combined operation is obtained.

A second object of the present invention is to provide a hydraulic drive system wherein, even when a load pressure of any one actuator reaches a setting pressure of a main relief valve during the combined operation in which a plurality of actuators are simultaneously driven, the other actuators are not sped up and good operability in the combined operation is obtained.

(1) To achieve the above first object, according to the present invention, there is provided a hydraulic drive system comprising an engine, a variable displacement hydraulic pump driven by the engine, a plurality of actuators driven by a hydraulic fluid delivered from the hydraulic pump, a plurality of directional control valves for controlling respective flow rates of the hydraulic fluid supplied from the hydraulic pump to the plurality of actuators, a plurality of pressure compensating valves for controlling respective differential pressures across the plurality of directional control valves, pump control means for performing load sensing control to hold a delivery pressure of the hydraulic pump higher than a maximum load pressure of the plurality of actuators by a target differential pressure, and a main relief valve for Restricting an upper limit of the delivery pressure of the hydraulic pump, a target compensated differential pressure for each of the plurality of pressure compensating values being set in accordance with a differential pressure between the delivery pressure of the hydraulic pump and the maximum load pressure of the plurality of actuators, a target differential pressure in the load sensing control being set as a variable value depending on a revolution speed of the engine, wherein the hydraulic drive system further comprises target compensated differential pressure modifying means for setting, as the target compensated differential pressure for each of the plurality of pressure compensating valves, a modification value different from the differential pressure between the delivery pressure of the hydraulic pump and the maximum load pressure of the plurality of actuators, when the delivery pressure of the hydraulic pump rises up to a setting pressure of the main relief Valve.

Thus, the target compensated differential pressure modifying means is provided to set, as the target compensated differential pressure, the modification value different from the differential pressure between the delivery pressure of the hydraulic pump and the maximum load pressure, when the delivery pressure of the hydraulic pump rises up to the setting pressure of the main relief valve. Accordingly, even when the load pressure of any one actuator reaches the setting pressure of the main relief valve during the combined operation in which a plurality of actuators are simultaneously driven, the target compensated differential pressure is not reduced down to 0, the pressure compensating valves are not closed, and the hydraulic fluid can be supplied to the other actuators. As a result, the other actuators are not stopped and good operability in the combined operation is ensured.

(2) Also, to achieve the above second object, according to the present invention, the modification value in the above (1) is a variable value depending on the revolution speed of the engine.

With that feature, when the engine revolution speed is lowered and the target differential pressure in the load sensing control, which is set as the variable value depending on the engine revolution speed, is reduced, the modification value set as the target compensated differential pressure is also reduced correspondingly. Therefore, even when the load pressure of any one actuator reaches the setting pressure of the main relief valve during the combined operation in which a plurality of actuators are simultaneously driven, the target compensated differential pressure is avoided from increasing beyond the target differential pressure in the load sensing control, thus resulting in that the other actuators are not sped up and good operability in the combined operation is ensured.

(3) Further, to achieve the above second object, according to the present invention, the modification value in the above (1) is equal to or smaller than the target differential pressure in the load sensing control set as a variable value depending on the revolution speed of the engine.

With that feature, when the engine revolution speed is lowered and the target differential pressure in the load sensing control, which is set as the variable value depending on the engine revolution speed, is reduced, the modification value set as the target compensated differential pressure is also reduced correspondingly. Therefore, even when the load pressure of any one actuator reaches the setting pressure of the main relief valve during the combined operation in which a plurality of actuators are simultaneously driven, the target compensated differential pressure is avoided from increasing beyond the target differential pressure in the load sensing control, thus resulting in that the other actuators are not sped up and good operability in the combined operation is ensured.

(4) In the above (1), preferably, the target compensated differential pressure modifying means includes a signal pressure relief valve which is provided in a maximum load pressure line for detecting the maximum load pressure, and which reduces an upper limit of the maximum load pressure detected by the maximum load pressure line to be lower than the setting pressure of the main relief valve by the modification value.

With that feature, when the delivery pressure of the hydraulic pump rises up to the setting pressure of the main relief valve, the maximum load pressure detected as a signal pressure by the maximum load pressure line is reduced to be lower than the setting pressure of the main relief valve by the modification value. Accordingly, the modification value set as the target compensated differential pressure becomes different from the differential pressure between the delivery pressure of the hydraulic pump and the maximum load pressure of the plurality of actuators.

(5) Still further, to achieve the above second object, according to the present invention, the signal pressure relief valve in the above (4) is a variable relief valve, and assuming a relief setting pressure of the variable relief valve to be $P_{LMAX0}$, the target differential pressure in the load sensing control to be $P_{GR}$, and the setting pressure of the main relief valve to be $P_R$, the relief setting pressure $P_{LMAX0}$ of the variable relief valve is set so as to satisfy:

$$P_{LMAX0}=P_R-P_{GR}+\alpha$$

(where $\alpha$ is a value smaller than $P_{GR}$)

With that feature, the modification value set as the target compensated differential pressure by the target compensated differential pressure modifying means is provided by $P_R-P_{LMAX0}=P_{GR}-\alpha$, which has a value smaller than $P_{GR}$ (i.e., the target differential pressure in the load sensing control set as a variable value depending on the revolution speed of the engine). Accordingly, as mentioned in the above (3), even when the load-pressure of any one actuator reaches the setting pressure of the main relief valve during the combined operation in which a plurality of actuators are simultaneously driven, the target compensated differential pressure is avoided from increasing beyond the target differential pressure in the load sensing control, thus resulting in that the other actuators are not sped up and good operability in the combined operation is ensured.

Also, by setting the modification value set as the target compensated differential pressure to not $P_{GR}$, but $P_{GR}-\alpha$ that is smaller than $P_{GR}$, it is possible to stably perform the load sensing control by the pump control means using a signal pressure corresponding to the same relief setting pressure $P_{LMAX0}$, and to improve stability of the system.

(6) Still further, to achieve the above second object, according to the present invention, the target compensated differential pressure modifying means in the above (1) includes a selector valve for changing over the target compensated differential pressure from the differential pressure between the delivery pressure of the hydraulic pump and the maximum load pressure of the plurality of actuators to the target differential pressure in the load sensing control, immediately before the delivery pressure of the hydraulic pump rises up to the setting pressure of the main relief valve.

With that feature, when the delivery pressure of the hydraulic pump rises up to the setting pressure of the main relief valve, the target differential pressure in the load sensing control is set as the target compensated differential pressure (modification value). Accordingly, as mentioned in the above (3), even when the load pressure of any one actuator reaches the setting pressure of the main relief valve during the combined operation in which a plurality of actuators are simultaneously driven, the target compensated differential pressure is avoided from increasing beyond the target differential pressure in the load sensing control, thus resulting in that the other actuators are not sped up and good operability in the combined operation is ensured.

Also, by changing over the signal pressure using the selector valve, the differential pressure between the delivery pressure of the hydraulic pump and the maximum load pressure of the plurality of actuators can be employed in the load sensing control by the pump control means after the relief. It is hence possible to stably perform the load sensing control and to improve stability of the system.

BEST MODE FOR CARRYING OUT THE INVENTION

Embodiments of the present invention will be described below with reference to the drawings.

Figure 1:
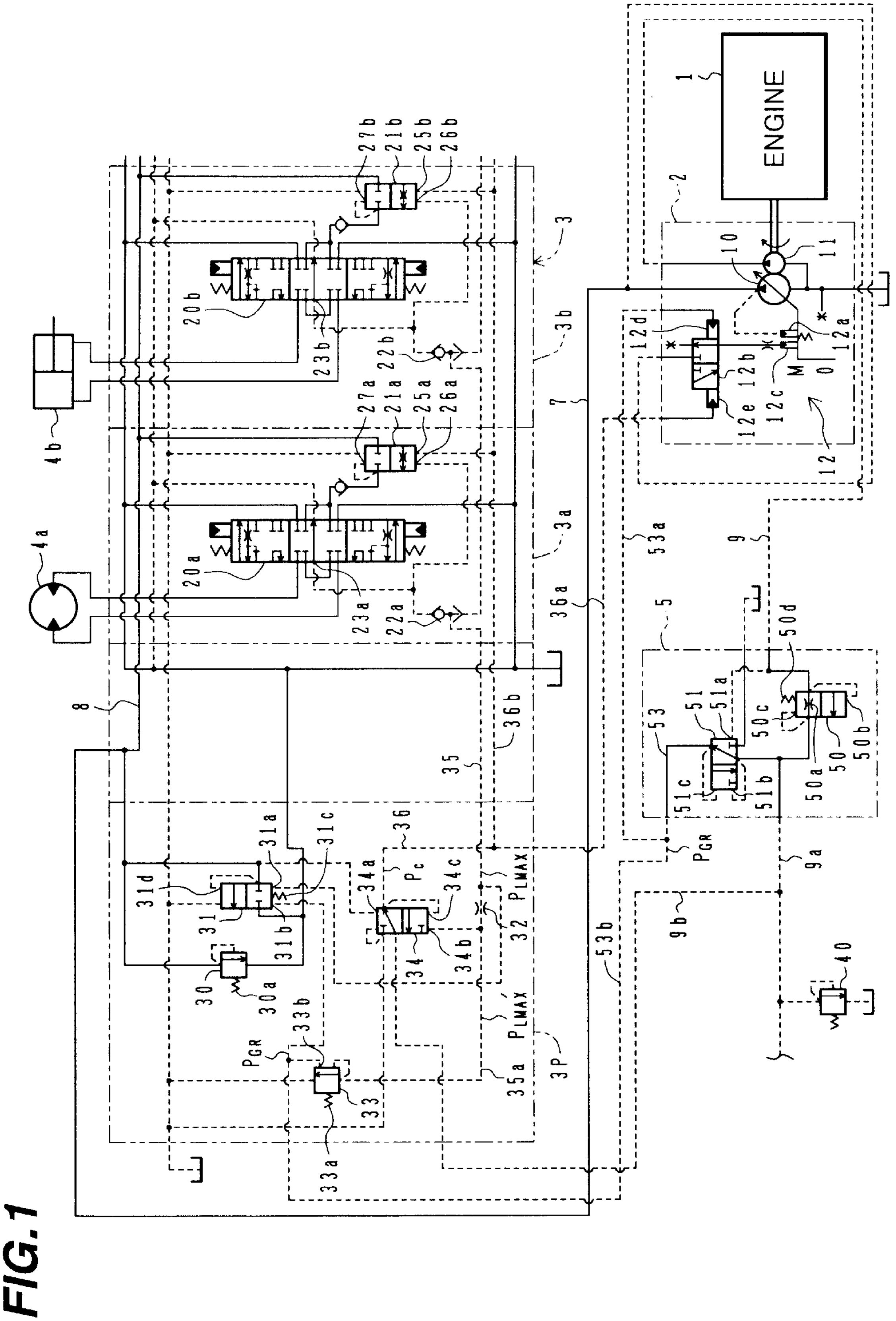
FIG. 1 is a hydraulic circuit diagram showing a hydraulic drive system according to a first embodiment of the present invention.

FIG. 1 shows a hydraulic drive system according to a first embodiment of the present invention. The hydraulic drive system of this first embodiment comprises an engine 1, a hydraulic source 2, a valve apparatus 3, a plurality of actuators 4*a*, 4*b*, . . . , and a target LS differential pressure generating circuit 5.

The hydraulic source 2 includes a variable displacement hydraulic pump 10 and a fixed displacement pilot pump 11, which are both driven by the engine 1, and also includes an LS/horsepower control regulator 12 for controlling a tilting (displacement) of the hydraulic pump 10. The LS/horsepower control regulator 12 comprises a horsepower control tilting actuator 12*a* for reducing the tilting of the hydraulic pump 10 when a delivery pressure of the hydraulic pump 10 increases, and an LS control valve 12*b* and an LS control tilting actuator 12*c* for performing load sensing control to hold the delivery pressure of the hydraulic pump 10 to be higher than a maximum load pressure of a plurality of actuators 4*a*, 4*b*, . . . by a target differential pressure.

The LS control valve 12*b* has a pressure receiving section 12*d* positioned on the side acting to reduce a pressure supplied to the actuator 12*c* for increasing the tilting of the hydraulic pump 10, and a pressure receiving section 12*e* positioned on the side acting to increase a pressure supplied to the actuator 12*c* for reducing the tilting of the hydraulic pump 10. A target differential pressure in the load sensing control, i.e., a target LS differential pressure, which is given as an output pressure of a pressure control valve 51 (described later) in the target LS differential pressure generating circuit 5, is introduced to the pressure receiving section 12*d*, and an output pressure of a pressure control valve 34 (usually a differential pressure between the delivery pressure of the hydraulic pump 10 and the maximum load pressure, that is, an LS differential pressure), is introduced as a load-sensing control signal pressure to the pressure receiving section 12*e*. In FIG. 1, a mark * affixed to a line connected to a reservoir port of the LS control valve 12*b* means that the line is connected to a line, also denoted by a mark *, branched from an inlet reservoir line of the hydraulic pump 10.

The valve apparatus 3 includes valve sections 3*a*, 3*b*, . . . corresponding respectively to the actuators 4*a*, 4*b*, . . . , and another valve section 3*p*. A plurality of closed center directional control valves 20*a*, 20*b*, . . . , a plurality of pressure compensating valves 21*a*, 21*b*, . . . , and shuttle valves 22*a*, 22*b*, . . . constituting a part of a maximum load pressure detecting circuit are disposed respectively in the valve sections 3*a*, 3*b*, . . . , whereas a main relief valve 30, a variable unloading valve 31, a fixed throttle 32, a signal pressure variable relief valve 33, and the aforesaid pressure control valve 34 are disposed in the valve section 3*p*.

The directional control valves 20*a*, 20*b*, . . . are connected to a hydraulic fluid supply line 8 which is in turn connected to a delivery line 7 of the hydraulic pump 10, and control respective flow rates and directions of the hydraulic fluid supplied to the actuators 4*a*, 4*b*, . . . from the hydraulic pump 2. Also, the directional control valves 20*a*, 20*b*, . . . are provided with load ports 23*a*, 23*b*, . . . for taking out respective load pressures of the actuators 4*a*, 4*b*, . . . when the actuators are driven. The load pressures taken out by the load ports 23*a*, 23*b*, . . . are supplied to one input ports of the shuttle valves 22*a*, 22*b*, . . . , respectively. The shuttle valves 22*a*, 22*b*, . . . are connected in a tournament fashion so that the maximum load pressure is detected as a signal pressure by a maximum load pressure line 35 connected to an output port of the shuttle valve 22*a* of the final stage.

The pressure compensating valves 21*a*, 21*b*, . . . are disposed respectively upstream of the directional control valves 20*a*, 20*b*, . . . , and control differential pressures across meter-in throttles of the directional control valves 20*a*, 20*b*, . . . so as to be kept equal to each other. To that end, the pressure compensating valves 21*a*, 21*b*, . . . have respectively pressure receiving sections 25*a*, 25*b*, . . ; 26*a*, 26*b*, . . . operating in the opening direction, and pressure receiving sections 27*a*, 27*b*, . . . operating in the closing direction. The output pressure of the pressure control valve 34 (usually the LS differential pressure) is introduced to the pressure receiving sections 25*a*, 25*b*, . . . . The load pressures of the actuators 4*a*, 4*b*, . . . (pressures downstream of the meter-in throttles of the directional control valves 20*a*, 20*b*, . . . ) taken out by the load ports 23*a*, 23*b*, . . . of the directional control valves 20*a*, 20*b*, . . . are introduced to the pressure receiving section 26*a*, 26*b*, . . . . Pressures upstream of the meter-in throttles of the directional control valves 20*a*, 20*b*, . . . are introduced to the pressure receiving sections 27*a*, 27*b*, . . . , respectively. Then, in accordance with the output pressure of the pressure control valve 34 (usually the LS differential pressure) introduced to the pressure receiving sections 25*a*, 25*b*, . . . , the pressure compensating valves 21*a*, 21*b*, . . . set the introduced output pressure as a target compensated differential pressure, and control differential pressures across the directional control valves 20*a*, 20*b*, . . . so as to be kept equal to the target compensated differential pressure.

By constructing the pressure compensating valves 21*a*, 21*b*, . . . as described above, during the combined operation in which a plurality of actuators 4*a*, 4*b*, . . . are simultaneously driven, the hydraulic fluid can be supplied to the actuators at a ratio depending on opening areas of the meter-in throttles of the directional control valves 20*a*, 20*b*, . . . , regardless of the magnitudes of load pressures. Also, even when a saturation state, where a delivery rate of the hydraulic pump 10 is insufficient for satisfying a flow rate demanded by the directional control valves 20*a*, 20*b*, . . . , occurs during the combined operation, the LS differential pressure is lowered depending on a degree of saturation, and the target compensated differential pressure for each of the pressure compensating valves 21*a*, 21*b*, . . . is also reduced correspondingly. Therefore, the delivery rate of the hydraulic pump 10 can be redistributed at a ratio of flow rates demanded by the actuators 4*a*, 4*b*, . . . .

The main relief valve 30 is connected to the hydraulic fluid supply line 8, and restricts an upper limit of the delivery pressure of the hydraulic pump 10. The main relief valve 30 has a spring 30_a_ for setting a relief pressure.

The variable unloading valve 31 is also connected to the hydraulic fluid supply line 8, and operates to limit the differential pressure between the delivery pressure of the hydraulic pump 10 and the maximum load pressure to a value slightly larger than the target LS differential pressure that is the output pressure of the pressure control valve 51. To that end, the variable unloading valve 31 has pressure receiving sections 31_a_, 31_b_ operating in the closing direction, a spring 31_c_ operating in the closing direction, and a pressure receiving section 31_d_ operating in the opening direction. The pressure (maximum load pressure) in the maximum load pressure line 35 and the target LS differential pressure given as the output pressure of the pressure control valve 51 are introduced respectively to the pressure receiving sections 31_a_, 31_b_, and the delivery pressure of the hydraulic pump 10 is introduced to the pressure receiving section 31_d_.

The fixed throttle 32 and the signal pressure variable relief valve 33 function to modify the maximum load pressure detected by the maximum load pressure line 35 when the delivery pressure of the hydraulic pump 10 rises up to the setting pressure of the main relief valve 30, so that the output pressure of the pressure control valve 34 will not become 0. The fixed throttle 32 is provided midway the maximum load pressure line 35, and the signal pressure variable relief valve 33 is connected to a portion (hereinafter referred to as a "signal pressure line") 35_a_ of the maximum load pressure line 35 downstream of the fixed throttle 32. The signal pressure variable relief valve 33 reduces an upper limit of the maximum load pressure detected by the signal pressure line 35_a_ to a level lower than the setting pressure of the main relief valve 30 by a value resulting from subtracting an LS control adjustment value a (i.e., a value for ensuring controllability of the LS control valve 12_b_; described later) from the target LS differential pressure given as the output pressure of the pressure control valve 51. To that end, the signal pressure variable relief valve 33 has a spring 33_a_ operating in the closing direction as a relief pressure setting means, and a pressure receiving section 33_b_ operating in the opening direction. The target LS differential pressure given as the output pressure of the pressure control valve 51 is introduced to the pressure receiving section 33_b_, and a setting pressure $P_{LMAX0}$ (described later) of the variable relief valve 33 is provided by a difference value between a setting value of the spring 33_a_ and the target LS differential pressure. Also, the setting value of the spring 33_a_ is set to a value greater than a pressure (setting pressure $P_R$) corresponding to a setting value of the spring 30_a_ of the main relief valve 30 by the aforesaid value α. With such an arrangement, when the maximum load pressure detected by the signal pressure line 35_a_ rises up to a value resulting from subtracting the target LS differential pressure from the pressure (=setting pressure of the main relief valve 30+α) corresponding to the setting value of the spring 33_a_, the signal pressure variable relief valve 33 is operated to prevent the detected maximum load pressure from rising further.

The pressure control valve 34 is a differential pressure generating valve for outputting, as an absolute pressure, a differential pressure between a pressure in the hydraulic fluid supply line 8 (the delivery pressure of the hydraulic pump 10) and a pressure in the signal pressure line 35_a_ (maximum load pressure). The pressure control valve 34 has a pressure receiving section 34_a_ operating in the direction to increase the pressure, and pressure receiving sections 34_b_, 34_c_ operating in the direction to reduce the pressure. The pressure in the hydraulic fluid supply line 8 is introduced to the pressure receiving section 34_a_, and the signal pressure in the signal pressure line 35_a_ and an output pressure of the pressure control valve 34 itself are introduced respectively to the pressure receiving sections 34_b_, 34_c_. Under a balanced condition among those pressures, the pressure control valve 34 outputs, based on a pressure of the pilot pump 11, a pressure equal to the differential pressure (LS differential pressure) between the pressure in the hydraulic fluid supply line 8 and the signal pressure in the signal pressure line 35_a_ to a signal pressure line 36. The output pressure of the pressure control valve 34 is supplied via signal pressure lines 36_a_, 36_b_ to the pressure receiving section 12_e_ of the LS control valve 12_b_ and to the pressure receiving sections 25_a_, 25_b_, . . . of the pressure compensating valves 21_a_, 21_b_, . . . .

Incidentally, the arrangement for outputting, as an absolute pressure, the LS differential pressure by the pressure control valve 34 is proposed by the invention disclosed in JP,A 10-89304.

The target LS differential pressure generating circuit 5 comprises a flow rate detecting valve 50 and a pressure generating valve 51. The flow rate detecting valve 50 has a throttle 50_a_ which is disposed in a delivery line 9 of the pilot pump 11. A relief valve 40 for specifying a base pressure of a pilot hydraulic source is connected to a portion 9_a_ of the delivery line 9 downstream of the flow rate detecting valve 50, and the line 9_a_ is connected to, e.g., remote control valves (not shown) for generating pilot pressures to shift the directional control valves 20_a_, 20_b_, . . . . The line 9_a_ is also connected to an input port of the pressure control valve 34 via a branched line 9_b_ and serves as a hydraulic source of the pressure control valve 34.

The flow rate detecting valve 50 detects a flow rate of the hydraulic fluid flowing through the delivery line 9 as change of a differential pressure across the throttle 50_a_, and the detected differential pressure is employed as the target LS differential pressure. Herein, the flow rate of the hydraulic fluid flowing through the delivery line 9 represents a delivery rate of the pilot pump 11, and the delivery rate of the pilot pump 11 is changed depending on the revolution speed of the engine 1. Thus, detecting the flow rate of the hydraulic fluid flowing through the delivery line 9 means detection of the revolution speed of the engine 1. For example, as the revolution speed of the engine 1 lowers, the flow rate of the hydraulic fluid flowing through the delivery line 9 is reduced and hence the differential pressure across the throttle 50_a_ is lowered.

The throttle 50_a_ is constructed as a variable throttle having an opening area that varies continuously. The flow rate detecting valve 50 further comprises a pressure receiving section 50_b_ operating in the opening direction, and a pressure receiving section 50_c_ and a spring 50_d_ both operating in the throttling direction. A pressure upstream of the variable throttle 50_a_ is introduced to the pressure receiving section 50_b_, and a pressure downstream of the variable throttle 50_a_ is introduced to the pressure receiving section 50_c_. An opening area of the variable throttle 50_a_ is thereby changed depending on a differential pressure across itself. By thus constructing the flow rate detecting valve 50 and employing the differential pressure across the variable throttle 50_a_ as the LS target differential pressure, a saturation phenomenon occurred depending on the engine revolution speed can be improved and good fine operability can be obtained even when the engine revolution speed is set to a low value. The foregoing point is described in detail in JP,A 10-196604.

The pressure generating valve 51 is a differential pressure generating valve for outputting, as an absolute pressure, the differential pressure across the variable throttle 50*a*. The pressure generating valve 51 has a pressure receiving section 51*a* operating in the direction to increase the pressure and pressure receiving sections 51*b*, 51*c* both operating in the direction to reduce the pressure. The pressure upstream of the variable throttle 50*a* is introduced to the pressure receiving section 51*a*, and the signal pressure downstream of the variable throttle 50*a* and an output pressure of the pressure generating valve 51 itself are introduced respectively to the pressure receiving sections 51*b*, 51*c*. Under a balanced condition among those pressures, the pressure generating valve 51 outputs, based on a pressure in the line 9*a*, a pressure equal to the differential pressure across the variable throttle 50*a* to a signal pressure line 53. The output pressure of the pressure control valve 51 is supplied, as the LS target differential pressure, to the pressure receiving section 12*d* of the LS control valve 12*b* via a signal pressure line 53*a*, and the same output pressure is also supplied, via a signal pressure line 53*b*, to the pressure receiving section 31*b* of the variable unloading valve 31 and to the pressure receiving section 33*b* of the signal pressure variable relief valve.

Herein, the opening area of the variable throttle 50*a* is set, for example, so as to provide a desired LS target differential pressure of about 15 $kgf/cm^2$ when the engine 1 is rotated in the rated state.

Figure 2:
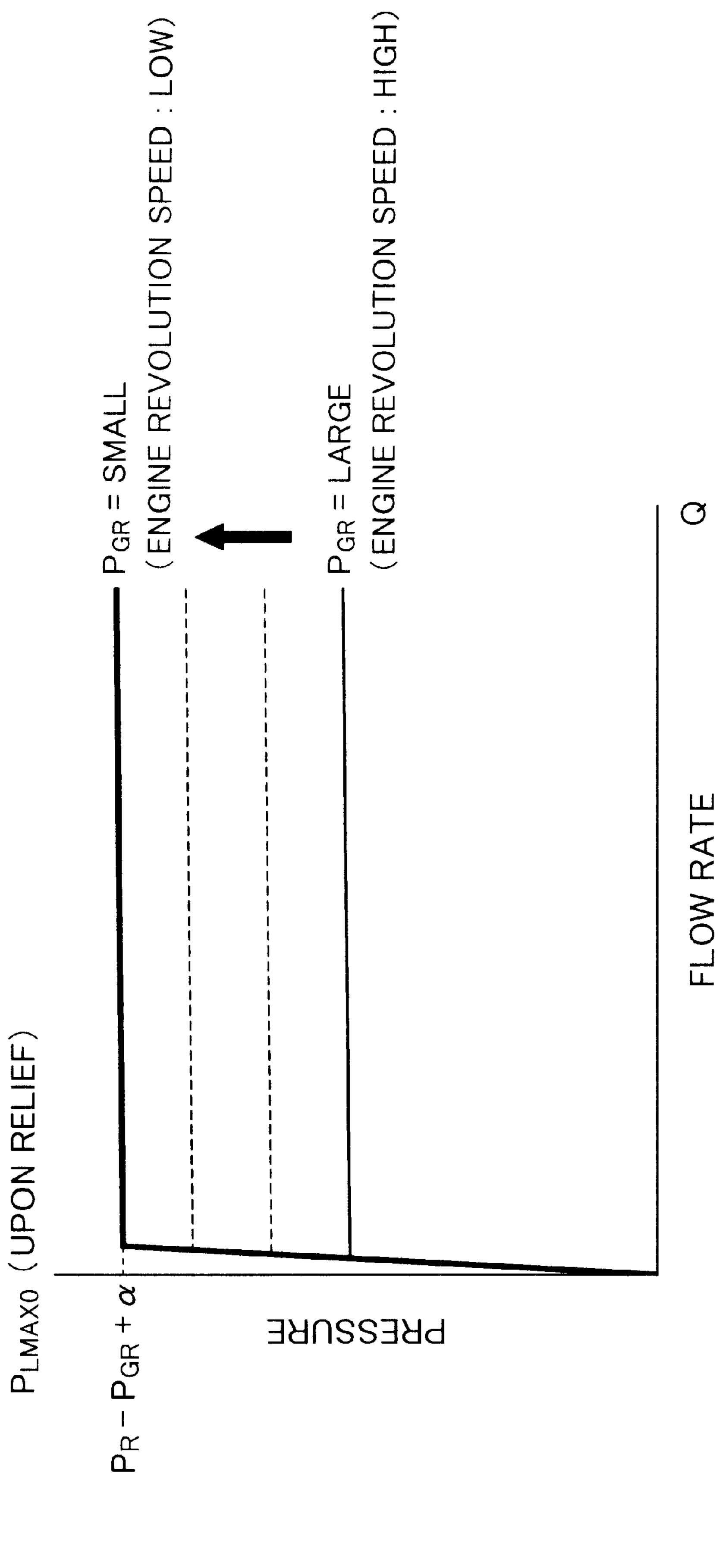
FIG. 2 is a graph showing override characteristics of a signal pressure variable relief valve.

FIG. 2 shows override characteristics of the signal pressure variable relief valve 33. In FIG. 2, $P_{LMAX0}$ represents the setting pressure of the signal pressure variable relief valve 33, $P_R$ represents the setting pressure of the main relief valve 30, and $P_{GR}$ represents the target LS differential pressure that varies depending on the engine revolution speed.

The setting pressure $P_{LMAX0}$ of the signal pressure variable relief valve 33 is controlled so as to satisfy the following formula with respect to the target LS differential pressure $P_{GR}$:

$$P_{LMAX0}=P_R-P_{GR}+\alpha$$

where α is an LS control adjustment value (described later)

Specifically, as the engine revolution speed lowers, the target LS differential pressure $P_{GR}$ is reduced and hence the setting pressure $P_{LMAX0}$ of the signal pressure variable relief valve 33 is increased correspondingly.

Figure 3:
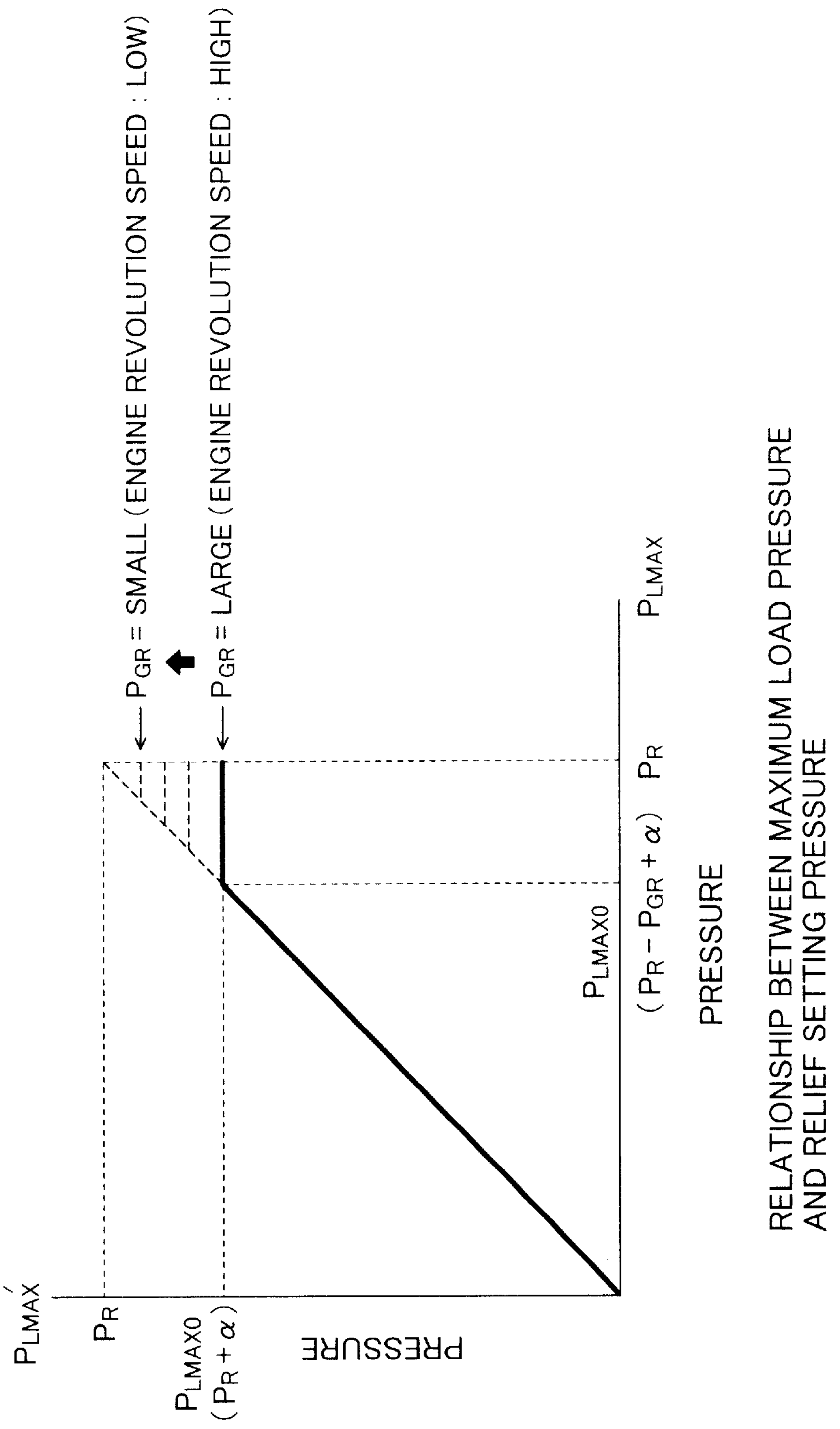
FIG. 3 is a graph showing the relationship between an actual maximum load pressure and a pressure (signal pressure) in a signal pressure line controlled by the signal pressure variable relief valve.

FIG. 3 shows the relationship between an actual maximum load pressure detected by the load pressure line 35 and the pressure (signal pressure) in the signal pressure line 35*a* resulting when the setting pressure $P_{LMAX0}$ of the signal pressure variable relief valve 33 is controlled as described above. In FIG. 3, $P_{LMAX}$ represents the actual maximum load pressure and $P_{LMAX}'$ represents the signal pressure.

Until the actual maximum load pressure $P_{LMAX}$ reaches the same level as the setting pressure $P_{LMAX0}$ of the signal pressure variable relief valve 33, the signal pressure variable relief valve 33 is not operated, thus resulting in $P_{LMAX}'=P_{LMAX}$. When the actual maximum load pressure $P_{LMAX}$ exceeds the setting pressure $P_{LMAX0}$ of the signal pressure variable relief valve 33, the signal pressure variable relief valve 33 is operated, whereby the pressure $P_{LMAX}'$ in the signal pressure line 35*a* does not rise further and reaches a uppermost limit (remains constant) at $P_{LMAX0}$. Also, since $P_{LMAX0}$ increases as the engine revolution speed lowers, the uppermost limit signal pressure $P_{LMAX}'$ is also increased.

Consequently, assuming that the delivery pressure of the hydraulic pump 10 is Ps and the target compensated differential pressure for each of the pressure compensating valves 21*a*, 21*b*, . . . is Pc, the target compensated differential pressure Pc, which is set by the pressure outputted from the pressure control valve 34 to the pressure receiving sections 25*a*, 25*b*, . . . of the pressure compensating valves 21*a*, 21*b*, . . . upon relief through the signal pressure variable relief valve 33, is expressed by:

$$Pc=Ps-P_{LMAX0}$$

Because of $Ps=P_R'$ $$Pc=P_{GR}-\alpha.$$

The operation of this embodiment having the above-described construction will be described below in comparison with Comparative Examples based on the prior art.

Figure 4:
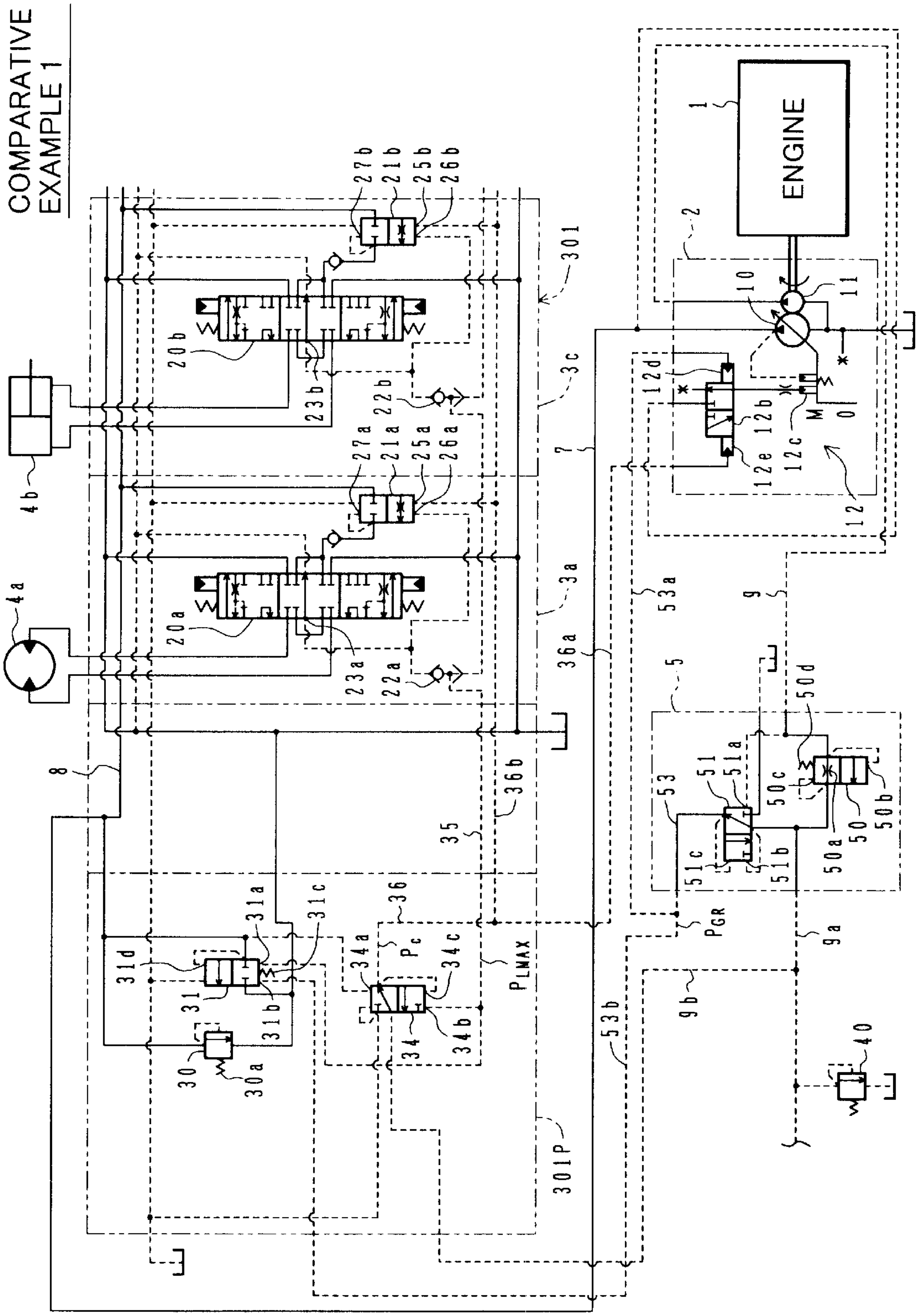
FIG. 4 is a hydraulic circuit diagram showing Comparative Example 1.

FIG. 4 shows Comparative Example 1 constructed by modifying the hydraulic drive system of this embodiment, show in FIG. 1, based on the prior art disclosed in JP,A 10-196604. In the construction of Comparative Example 1, the valve apparatus 3 shown in FIG. 1 is replaced by a valve apparatus 301; the fixed throttle 32 and the signal pressure variable relief valve 33 shown in FIG. 1 are not provided in a valve section 301*p* of the valve apparatus 301; and the maximum load pressure detected by the maximum load pressure line 35 is directly introduced to the pressure control valve 34.

With the construction of Comparative Example 1, during the combined operation in which, for example, the actuators 4*a*, 4*b* are simultaneously driven, when the load pressure of one actuator reaches the setting pressure of the main relief valve 30, no hydraulic fluid is supplied to the other actuator, of which load pressure does not yet reach the setting pressure of the main relief valve 30. In other words, when the load pressure of any one actuator reaches the setting pressure of the main relief valve 30 during the combined operation, the actuators are all stopped.

Figure 5:
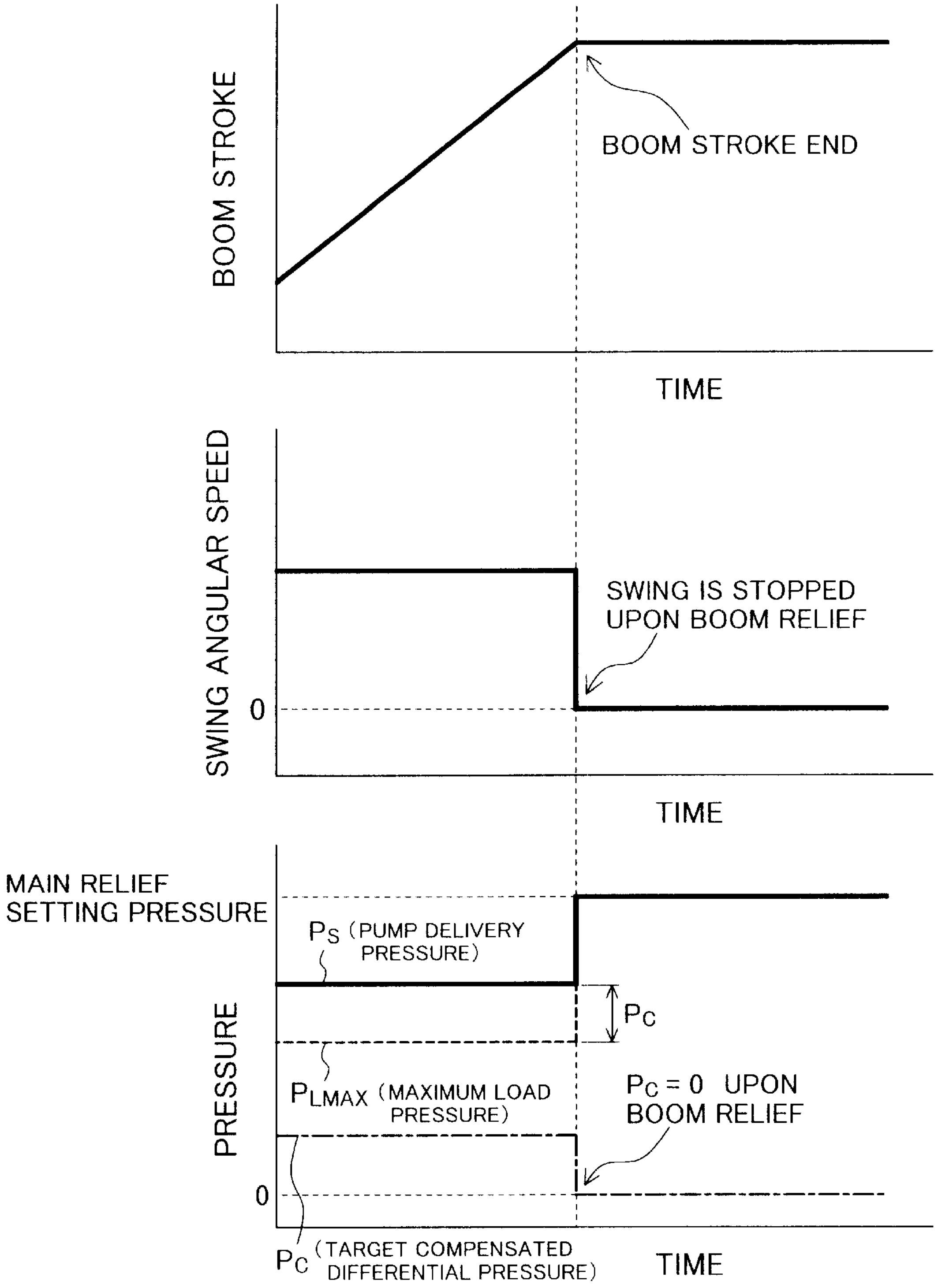
FIG. 5 is a chart showing changes over time of a boom stroke, a swing angular speed, a pump delivery pressure, a maximum load pressure, and a target compensated differential pressure resulting when the combined operation of boom raising and swirl is performed in Comparative Example 1.

FIG. 5 shows an example of the operation of Comparative Example 1. FIG. 5 is a chart showing changes over time of a boom stroke, a swing angular speed, a pump delivery pressure Ps, a maximum load pressure $P_{LMAX}$, and a target compensated differential pressure Pc resulting when the combined operation of boom raising and swing, i.e., a typical excavation work of a hydraulic excavator, is performed with the actuator 4*a* serving as a swing motor of the hydraulic excavator and the actuator 4*b* serving as a boom cylinder of the hydraulic excavator.

In FIG. 5, when the boom cylinder 4*b* reaches the stroke end, both of the maximum load pressure $P_{LMAX}$ and the pump delivery pressure Ps rise up to the setting pressure of the main relief valve 30. This results in $Ps=P_{LMAX}$. Therefore, the output pressure Pc outputted as the target compensated differential pressure to the pressure compensating valves 21*a*, 21*b* from the pressure control valve 34 is provided by $Pc(=Ps-P_{LMAX})=0(kgf/cm^2)$, and only the differential pressures across the directional control valves 20*a*, 20*b* act upon the pressure receiving sections 26*a*, 27*a*; 26*b*, 27*b* of the pressure compensating valves 21*a*, 21*b*.

If some hydraulic fluid flows through the directional control valves 20*a*, 20*b* in that condition, spools of the pressure compensating valves 21*a*, 21*b* are subjected to forces acting in the closing direction. On this occasion, there are flows of the hydraulic fluid as long as the pressure compensating valves 21*a*, 21*b* are opened. Hence, the pressure compensating valves 21*a*, 21*b* are continuously subjected to forces acting in the closing direction until they are fully closed. Therefore, the pressure compensating valves 21*a*, 21*b* are eventually fully closed. With the full closing of the pressure compensating valves 21*a*, 21*b*, the supply of the hydraulic fluid to the swing motor 4*a* is ceased and the swing angular speed is reduced down to 0.

Thus, when the boom cylinder 4*b* reaches the stroke end and the load pressure of the boom cylinder 4*b* rises up to the setting pressure of the main relief valve 30 during the combined operation of boom raising and swing, the swing is stopped and the operability is remarkably impaired.

As means for solving the drawback mentioned above, it is conceivable, as disclosed in GB2195745A, to provide a signal pressure relief valve for setting an upper limit of $P_{LMAX}$ as a signal pressure, and to set the setting pressure of the signal pressure relief valve to be lower than the setting pressure of the main relief valve 30 so that $Ps=P_{LMAX}$ is not resulted upon relief through the main relief valve 30.

Figure 6:
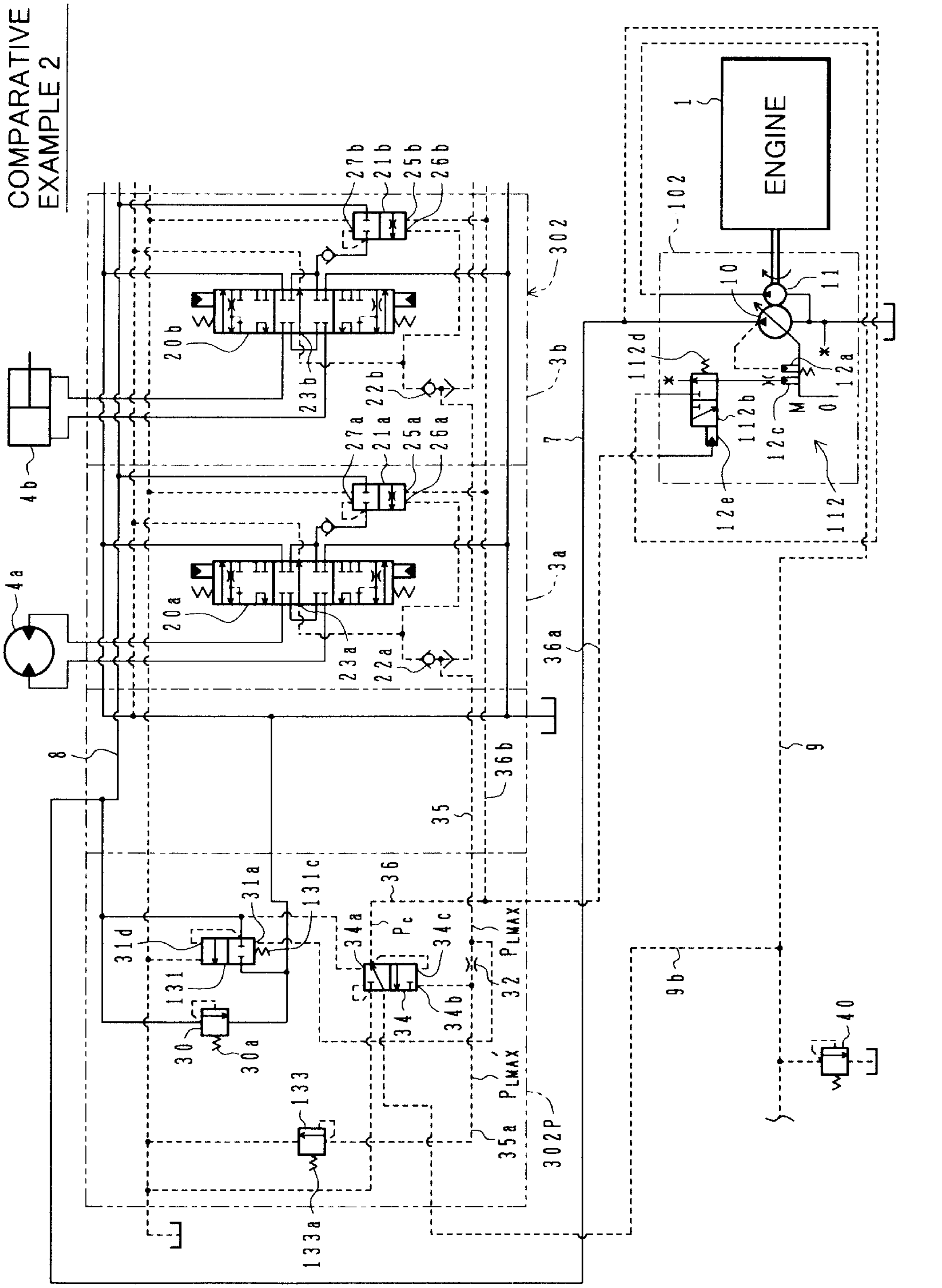
FIG. 6 is a hydraulic circuit diagram showing Comparative Example 2.

Such a construction is shown as Comparative Example 2 in FIG. 6. Comparative Example 2 differs from the hydraulic drive system of this embodiment shown in FIG. 1 as follows. The target LS differential pressure generating circuit 5 is removed, and instead of the LS control valve 12*b* shown in FIG. 1, an LS control valve 112*b* having a spring 112*d* for setting the LS target value as a constant value is provided in an LS/horsepower control regulator 112 of a hydraulic source 102. Further, the valve apparatus 3 shown in FIG. 1 is replaced by a valve apparatus 302, and instead of the variable unloading valve 31 and the signal pressure variable relief valve 33 shown in FIG. 1, a variable unloading valve 131 and a signal pressure relief valve 133 having setting pressures fixedly set by springs 131*c*, 133*a*, respectively, are provided in a valve section 302*p* of the valve apparatus 302.

By providing the signal pressure relief valve 133 in the maximum load pressure line 35 through the fixed throttle 32 and introducing a pressure $P_{LMAX}'$ in the signal pressure line 35*a*, which has been controlled by the signal pressure relief valve 133, to the pressure control valve 34, the pressure $P_{LMAX}'$ lower than the setting pressure of the main relief valve 30 is introduced as a signal pressure to the pressure control valve 34 upon relief through the main relief valve 30.

Figure 7:
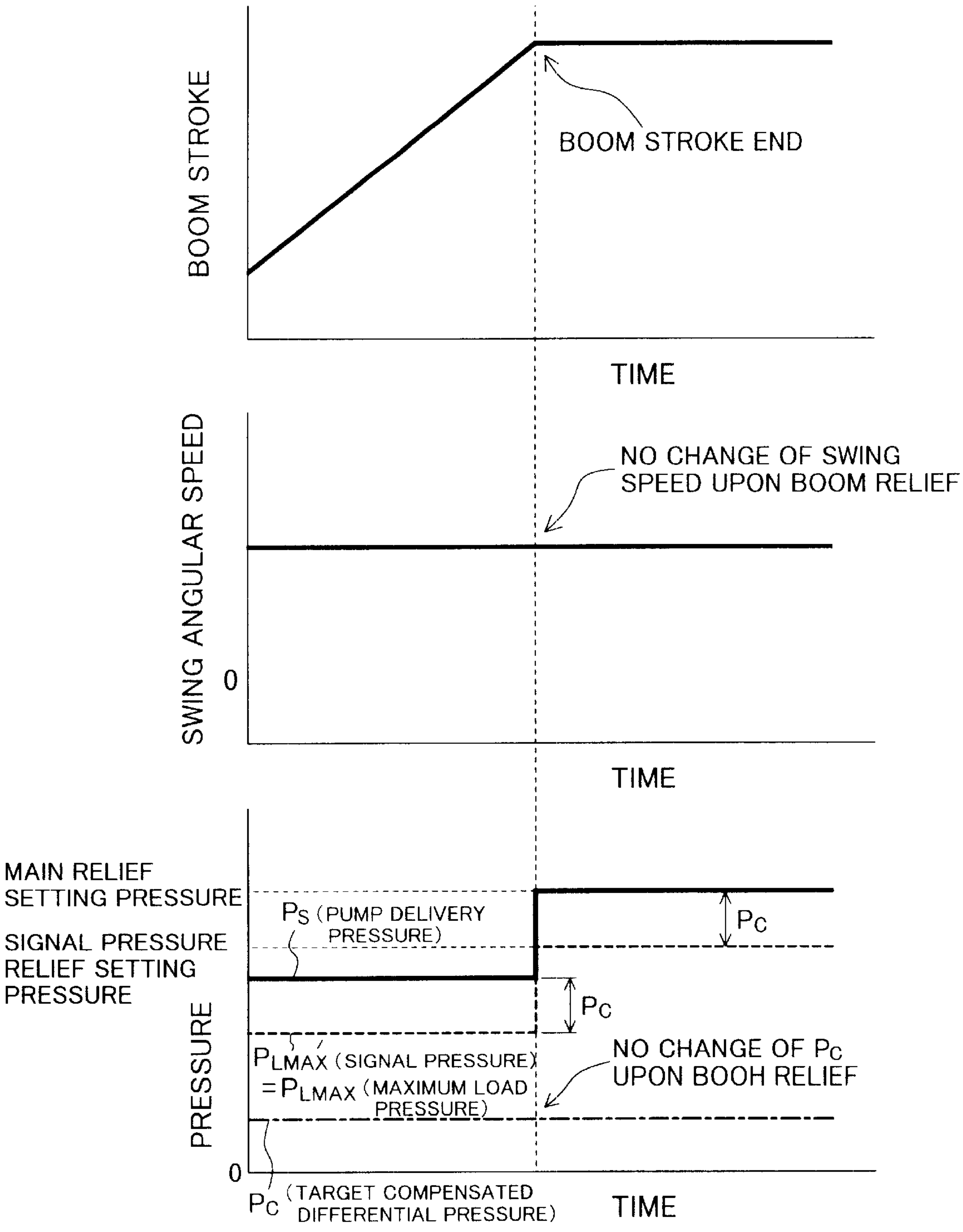
FIG. 7 is a chart showing changes over time of a boom stroke, a swing angular speed, a pump delivery pressure, a signal pressure, and a target compensated differential pressure resulting when the combined operation of boom raising and swing is performed in Comparative Example 2, and changes over time of the same status variables resulting when the combined operation of boom raising and swing is performed Comparative Example 3 at a rated engine revolution speed.

FIG. 7 is a chart showing changes over time of a boom stroke, a swing angular speed, a pump delivery pressure Ps, a pressure (signal pressure) $P_{LMAX}'$ in the signal pressure line 35*a*, and a target compensated differential pressure Pc resulting when the combined operation of boom raising and swing is performed in Comparative Example 2.

In FIG. 7, when the boom cylinder 4*b* reaches the stroke end, both of the maximum load pressure $P_{LMAX}$ and the pump delivery pressure Ps rise up to the setting pressure of the main relief valve 30. At this time, the pressure $P_{LMAX}'$ in the signal pressure line 35*a* controlled by the signal pressure relief valve 133 is limited to a level lower than the setting pressure of the main relief valve 30. Therefore, the output pressure Pc ($=Ps-P_{LMAX}'$) outputted as the target compensated differential pressure to the pressure compensating valves 21*a*, 21*b* from the pressure control valve 34 is not reduced down to 0, but given by the differential pressure between the setting pressure of the main relief valve 30 and the setting pressure of the signal pressure relief valve 133.

Herein, by setting the setting pressure $P_{LMAX0}$ of the signal pressure relief valve 133 as defined in the following formula, the target compensated differential pressure is not changed between during the boom operation before the main relief valve 30 is operated and when the main relief valve 30 is operated:

$$P_{LMAX}=\text{main relief setting value}-\text{target } LS \text{ differential pressure}$$

Consequently, even when the boom cylinder 4*b* reaches the stroke end and the main relief valve 30 is operated for relief, the swing is not stopped and the operability in the combined operation is maintained.

However, if the above-mentioned solving means is directly applied to the hydraulic drive system disclosed in JP,A 10-196604, another drawbacks occurs.

Figure 8:
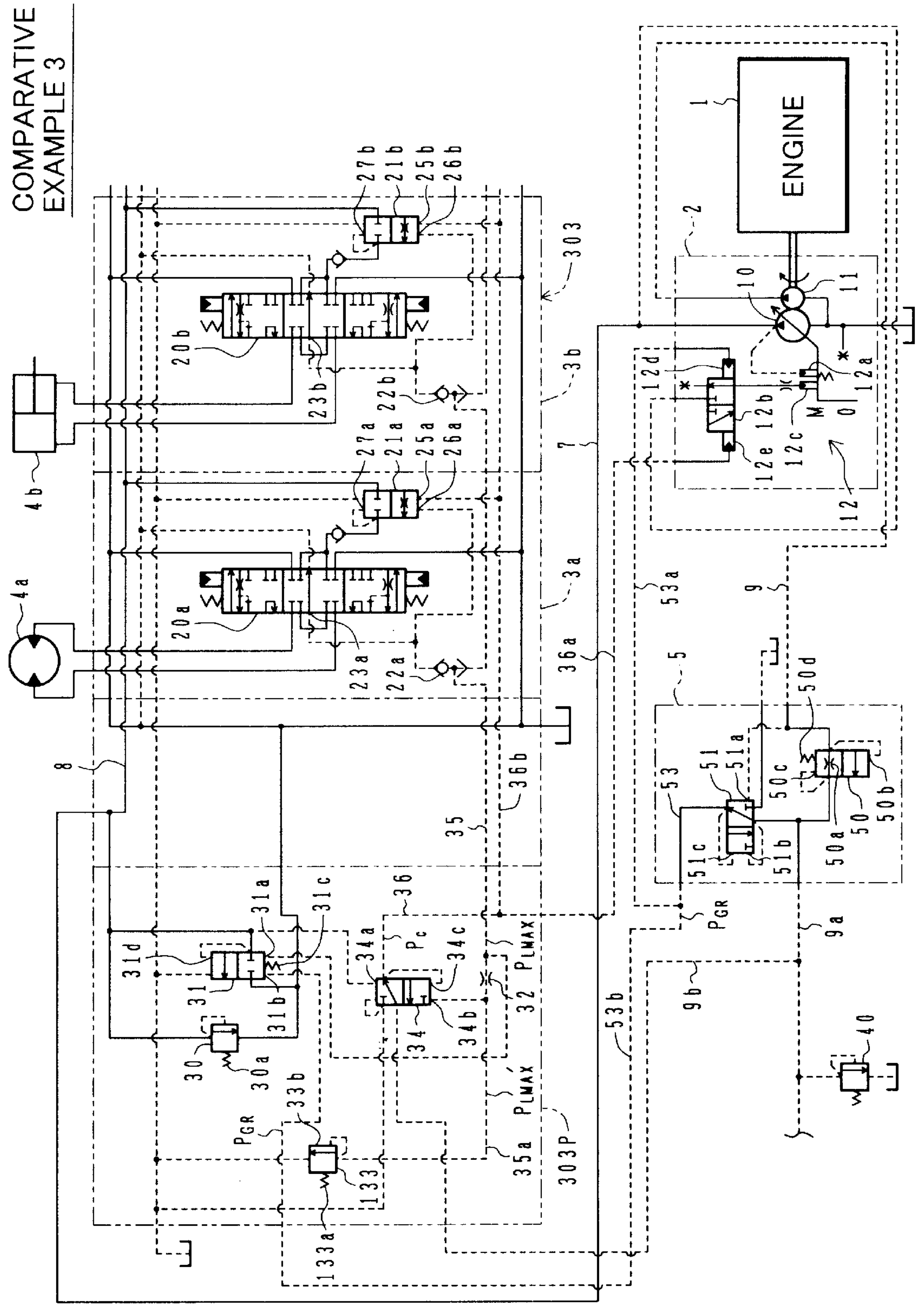
FIG. 8 is a hydraulic circuit diagram showing Comparative Example 3.

Such a construction is shown as Comparative Example 3 in FIG. 8. Comparative Example 3 is constructed by modifying the hydraulic drive system of this embodiment, shown in FIG. 1, based on the concept of the prior art disclosed in GB2195745A. The valve apparatus 3 shown in FIG. 1 is replaced by a valve apparatus 303, and instead of the signal pressure variable relief valve 33 shown in FIG. 1, a signal pressure relief valve 133 having a setting pressure fixedly set by a springs 133*a* is provided in a valve section 303*p* of the valve apparatus 303. Note that Comparative Example 3 represents the basic concept of the embodiment shown in FIG. 1 and constitutes a part of the present invention.

The signal pressure relief valve 133 operates in the same manner as in Comparative Example 2. Additionally, in Comparative Example 3, the target LS differential pressure is varied depending on the engine revolution speed. The setting pressure of the spring 133*a* of the signal pressure relief valve 133 is set lower than the setting pressure of the main relief valve 30 by an amount corresponding to the target LS differential pressure resulting when the engine revolution speed is set to the rated value.

The operation of Comparative Example 3 at the engine revolution speed set to the rated value is the same as in Comparative Example 2. Hence, as shown in FIG. 7, even when the boom cylinder 4*b* reaches the stroke end and the main relief valve 30 is operated for relief during the combined operation of boom raising and swing, the swing angular speed is not reduced and the operability in the combined operation is maintained.

On the other hand, when the engine revolution speed is set to a level lower than the rated value, the target LS differential pressure is lowered in Comparative Example 3 so that the speeds of the actuators 4*a*, 4*b* are reduced with respect to the same input amounts from control levers of the directional control valves 20*a*, 20*b*, . . . as in the rated state.

Figure 9:
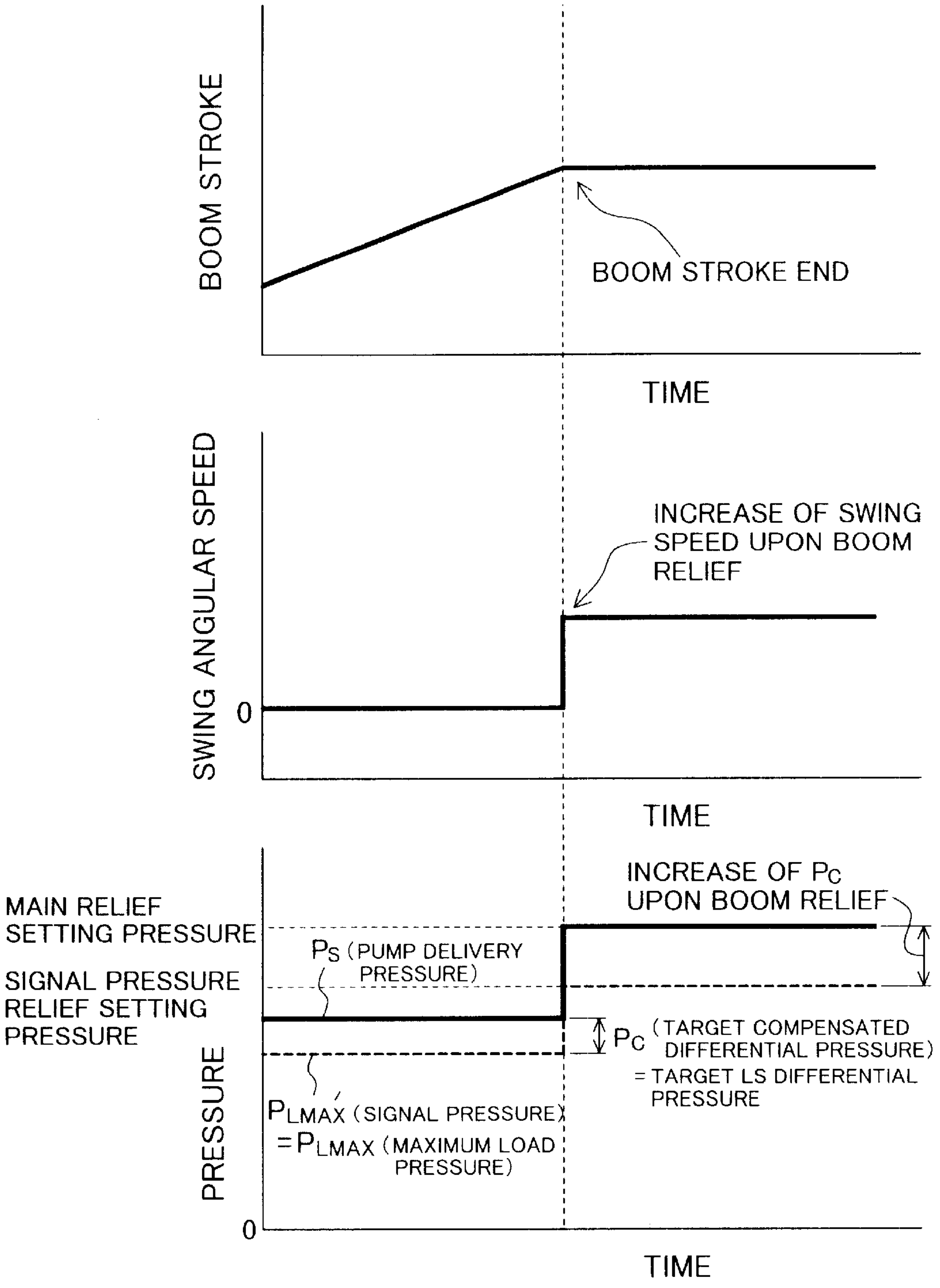
FIG. 9 is a chart showing changes over time of a boom stroke, a swing angular speed, a pump delivery pressure, a signal pressure, and a target compensated differential pressure resulting when the combined operation of boom raising and swing is performed in Comparative Example 3 at an engine revolution speed set lower than the rated value.

FIG. 9 is a chart showing changes over time of the same status variables as shown in FIG. 7 resulting when the combined operation of boom raising and swing is performed in Comparative Example 3 at an engine revolution speed set lower than the rated value.

Referring to FIG. 9, in the boom-raising operation before the main relief valve 30 is operated for relief, the pump delivery pressure Ps is held higher than the maximum load pressure $P_{LMAX}(=P_{LMAX}')$ by the target LS differential pressure. Since the target LS differential pressure in this case is lower than that resulting when the engine revolution speed is set to the rated value, the differential pressure $Ps-P_{LMAX}$ between the pump delivery pressure and the engine revolution speed, i.e., the target compensated differential pressure Pc of the pressure compensating valves 21*a*, 21*b* set by the output pressure of the pressure control valve 34, is maintained to a level lower than when the engine revolution speed is set to the rated value.

When the boom cylinder 4*b* reaches the stroke end and the main relief valve 30 is operated for relief, the pressure $P_{LMAX}'$ in the signal pressure line 35*a* is limited by the signal pressure relief valve 133 to a level lower than the maximum load pressure $P_{LMAX}$. In this case, the difference between the pump delivery pressure Ps and the signal pressure $P_{LMAX}'$ is given as the target LS differential pressure at the rated engine revolution speed, the target compensated differential pressure Pc of the pressure compensating valves 21*a*, 21*b* set by the output pressure of the pressure control valve 34 is increased from a level during the boom operation before the relief.

Consequently, the angular speed of the swing in the combined operation with a boom is increased at the same time as when the boom cylinder 4*b* reaches the stroke end. As a result, the operability in the combined operation is remarkably impaired.

In this embodiment, as described above, the signal pressure relief valve 33 is constructed as a variable relief valve, and the setting value of the variable relief valve is varied depending on the target LS differential pressure that changes with the engine revolution speed. The above-mentioned drawback can be overcome with such an arrangement.

The operation of the system of this embodiment in the combined operation of boom raising and swing, for example, will be described below as with Comparative Examples.

Figure 10:
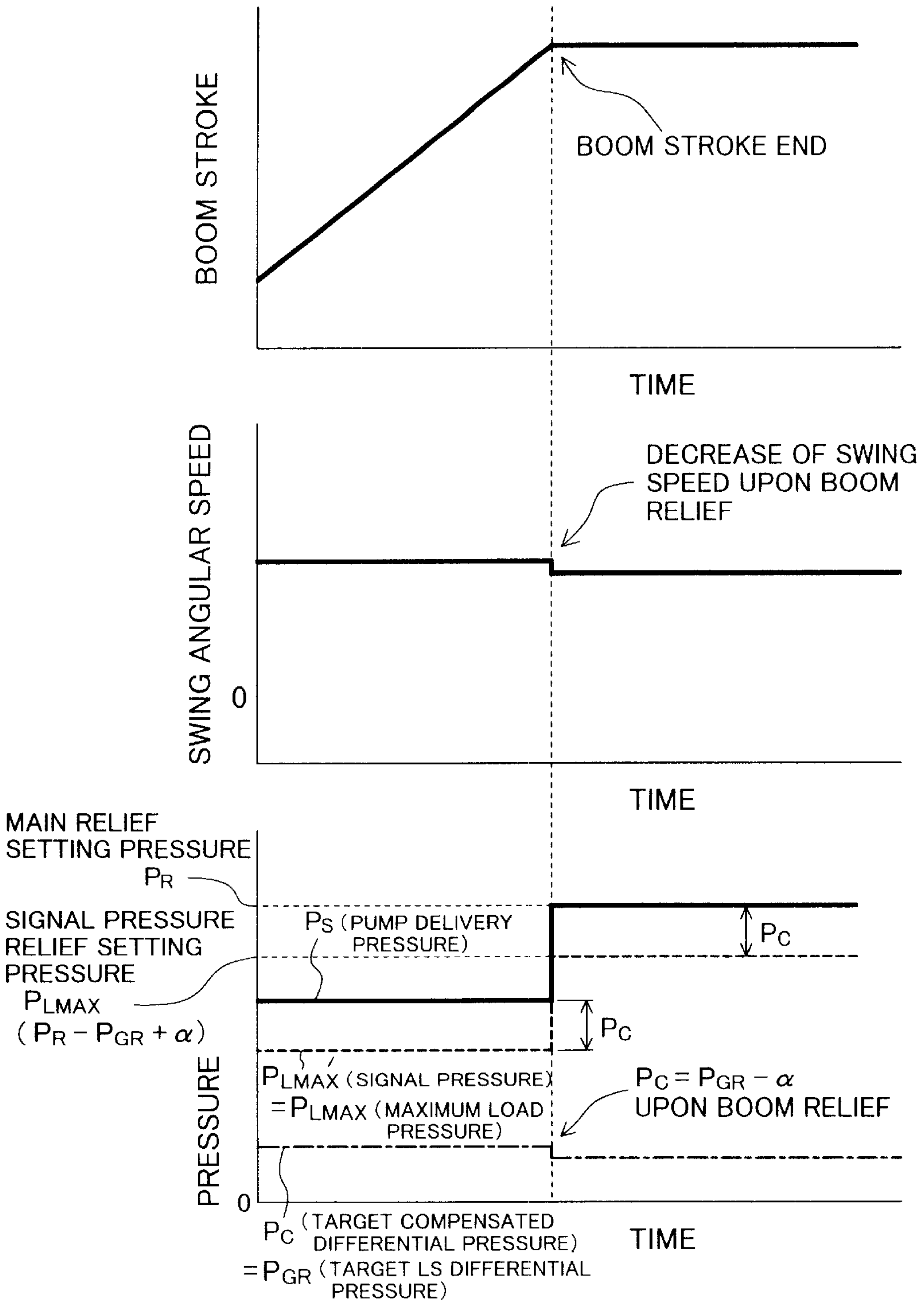
FIG. 10 is a chart showing changes over time of a boom stroke, a swing angular speed, a pump delivery pressure, a signal pressure, and a target compensated differential pressure resulting when the combined operation of boom raising and swing is performed in Comparative Example 1.
Figure 11:
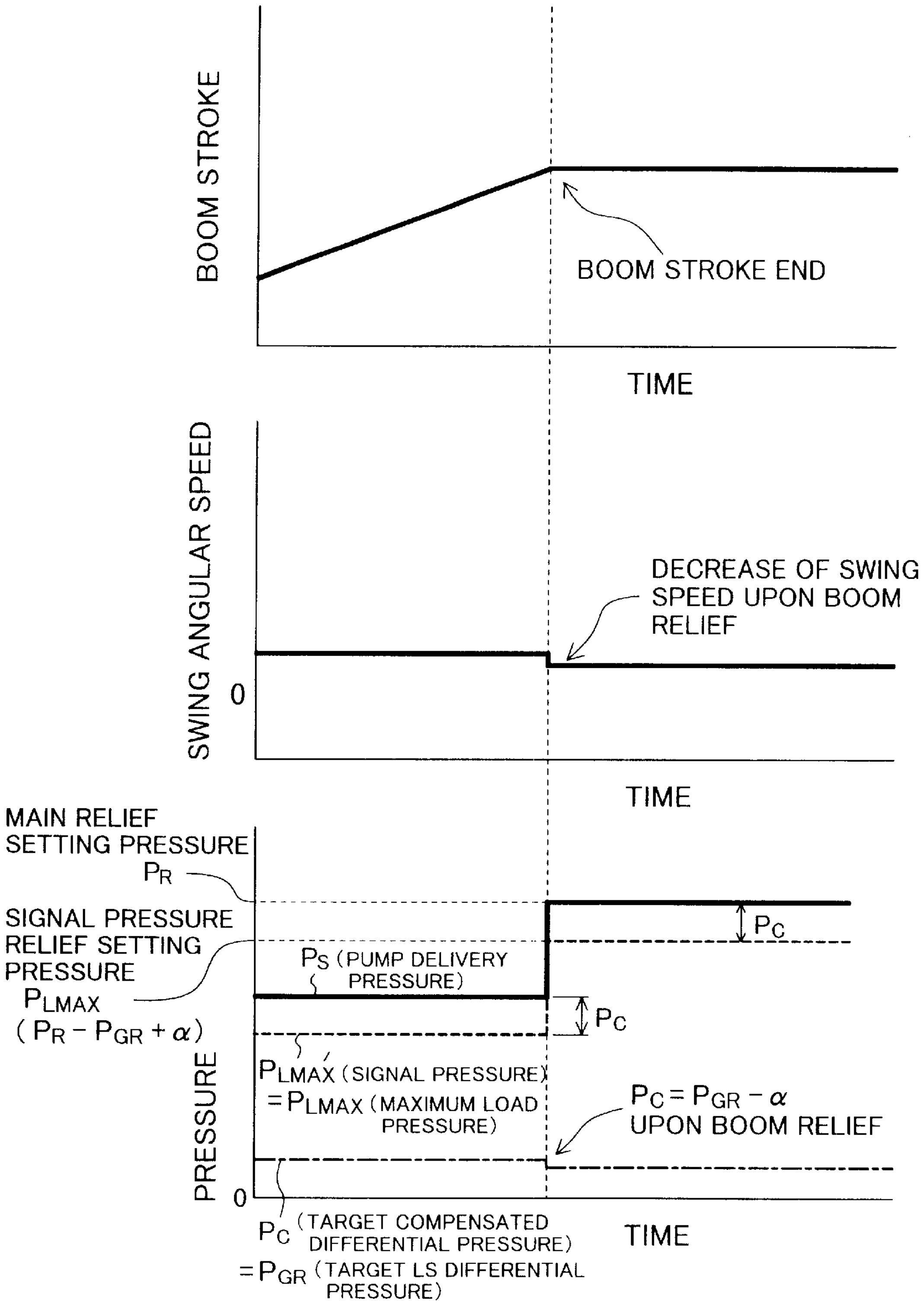
FIG. 11 is a chart showing changes over time of a boom stroke, a swing angular speed, a pump delivery pressure, a signal pressure, and a target compensated differential pressure resulting when the combined operation of boom raising and swing is performed in a first embodiment of the present invention at an engine revolution speed set lower than the rated-value.

FIG. 10 is a chart showing changes over time of the same status variables as shown in FIG. 7 resulting when the combined operation of boom raising and swing is performed in the system of this embodiment at an engine revolution speed set to the rated value. FIG. 11 is a chart showing changes over time of the same status variables as shown in FIG. 7 resulting when the combined operation of boom raising and swing is performed in the system of this embodiment at an engine revolution speed set lower than the rated value.

Referring to FIG. 10, in the boom-raising operation before the main relief valve 30 is operated for relief, the signal pressure variable relief valve 33 is not operated and the maximum load pressure $P_{LMAX}$ is directly detected as the signal pressure $P_{LMAX}'$ by the signal pressure line 35*a*. Also, the pump delivery pressure Ps is held higher than the maximum load pressure $P_{LMAX}(=P_{LMAX}')$ by the target LS differential pressure $P_{GR}$. Therefore, the target compensated differential pressure Pc of the pressure compensating valves 21*a*, 21*b* set by the output pressure of the pressure control valve 34 is equal to the differential pressure $Ps-P_{LMAX}$ between the pump delivery pressure and the engine revolution speed, i.e., the target LS differential pressure $P_{GR}$, $(Pc=P_{GR})$.

When the boom cylinder 4*b* reaches the stroke end and the main relief valve 30 is operated for relief, both of the maximum load pressure $P_{LMAX}$ and the pump delivery pressure Ps rise up to the setting pressure $P_R$ of the main relief valve 30. At this time, the setting pressure $P_{LMAX0}$ of the signal pressure variable relief valve 33 is controlled so as to satisfy $P_{LMAX0}=P_R-P_{GR}+a$ with respect to the target LS differential pressure $P_{GR}$, and the pressure $P_{LMAX}'$ in the signal pressure line 35*a* controlled by the signal pressure variable relief valve 33 is limited to $P_{LMAX}'=P_R-P_{GR}+a$ that is lower than the setting pressure $P_R$ of the main relief valve 30. Therefore, the output pressure Pc $(=Ps-P_{LMAX}')$ outputted as the target compensated differential pressure to the pressure compensating valves 21*a*, 21*b* from the pressure control valve 34 is not reduced down to 0, but given by the differential pressure between the setting pressure of the main relief valve 30 and the setting pressure of the signal pressure variable relief valve 33, i.e., $Pc=P_{GR}-a$.

As a result, even when the boom cylinder 4*b* reaches the stroke end and the main relief valve 30 is operated for relief, the swing is not stopped and the operability in the combined operation is maintained.

The system of this embodiment operates likewise also when the engine revolution speed is set to a level lower than the rated value. More specifically, referring to FIG. 11, in the boom-raising operation before the main relief valve 30 is operated for relief, the target compensated differential pressure Pc of the pressure compensating valves 21*a*, 21*b* is equal to the target LS differential pressure $P_{GR}$ $(Pc=P_{GR})$. When the boom cylinder 4*b* reaches the stroke end, the target compensated differential pressure Pc $(=Ps-P_{LMAX}')$ of the pressure compensating valves 21*a*, 21*b* is not reduced down to 0, but given by the differential pressure between the setting pressure of the main relief valve 30 and the setting pressure of the signal pressure variable relief valve 33 $(Pc=P_{GR}-a)$. In this case, however, since the target LS differential pressure $P_{GR}$ is lower than that when the engine revolution speed is set to the rated value, the target compensated differential pressure Pc of the pressure compensating valves 21*a*, 21*b* is maintained at a level lower than when the engine revolution speed is set to the rated value.

As a result, even when the boom cylinder 4*b* reaches the stroke end and the main relief valve 30 is operated for relief, the swing is not stopped and the operability in the combined operation is maintained with no increase of the swing angular speed.

Furthermore, in this embodiment, the setting pressure $P_{LMAX0}$ of the signal pressure variable relief valve 33 is set to $P_{LMAX0}=P_R-P_{GR}+\alpha$, instead of $P_{LMAX0}=P_R-P_{GR}$, with respect to the target LS differential pressure $P_{GR}$. The advantage resulting from such setting will be described below.

The output pressure Pc of the pressure control valve 34 is also supplied as the load-sensing control signal pressure to the LS control valve 12*b* of the LS/horsepower control regulator 12. To the LS control valve 12*b*, there are introduced the target LS differential pressure $P_{GR}$ in the direction to increase the delivery rate of the hydraulic pump 10 and the load-sensing control signal pressure Pc in the direction to reduce the delivery rate of the hydraulic pump 10. By setting of $Pc=P_{GR}-\alpha$, therefore, the pump delivery rate is controlled so as to maximize within the range of horsepower control flow rate provided by the horsepower control tilting actuator 12*a* upon relief through the main relief valve 30.

Assuming a=0, for example, the LS control valve 12*b* is subjected to the same signal pressure at the pressure receiving sections 12*d*, 12*e* at both ends thereof, and therefore loses controllability. This results in unstable operation of the LS control valve 12*b* under effects caused by variations in the setting pressure of the main relief valve 30 and the setting pressure of the signal pressure variable relief valve 33.

For the reason mentioned above, setting the LS control adjustment value α ensures the stable operation of the system.

By the setting of α, however, the target compensated differential pressure Pc outputted from the pressure control valve 34 upon relief through the main relief valve 30 becomes lower than that during the operation before the relief by α $(Pc=P_{GR}\rightarrow Pc=P_{GR}-\alpha)$, and the speed of the other actuator operated in the combined operation is lowered (see FIGS. 10 and 11). Taking into account the above problem, in practice, a is set to be in a range in which the operator does not feel noticeably speed change during the operation. By way of example, a can be set as given below:

$$\alpha=Pc_0\times 0.14$$

where $Pc_0$ is the target LS differential pressure at the rated engine revolution speed.

With this embodiment, as described above, even when the load pressure of any one actuator reaches the setting pressure of the main relief valve 30 during the combined operation in which a plurality of actuators 4*a*, 4*b*, . . . are simultaneously driven, the other actuators are neither stopped nor sped up, and good operability in the combined operation is maintained.

A second embodiment of the present invention will be described with reference to FIGS. 12 to 14. In these drawings, identical members to those shown in FIG. 1 are denoted by the same reference numerals.

Figure 12:
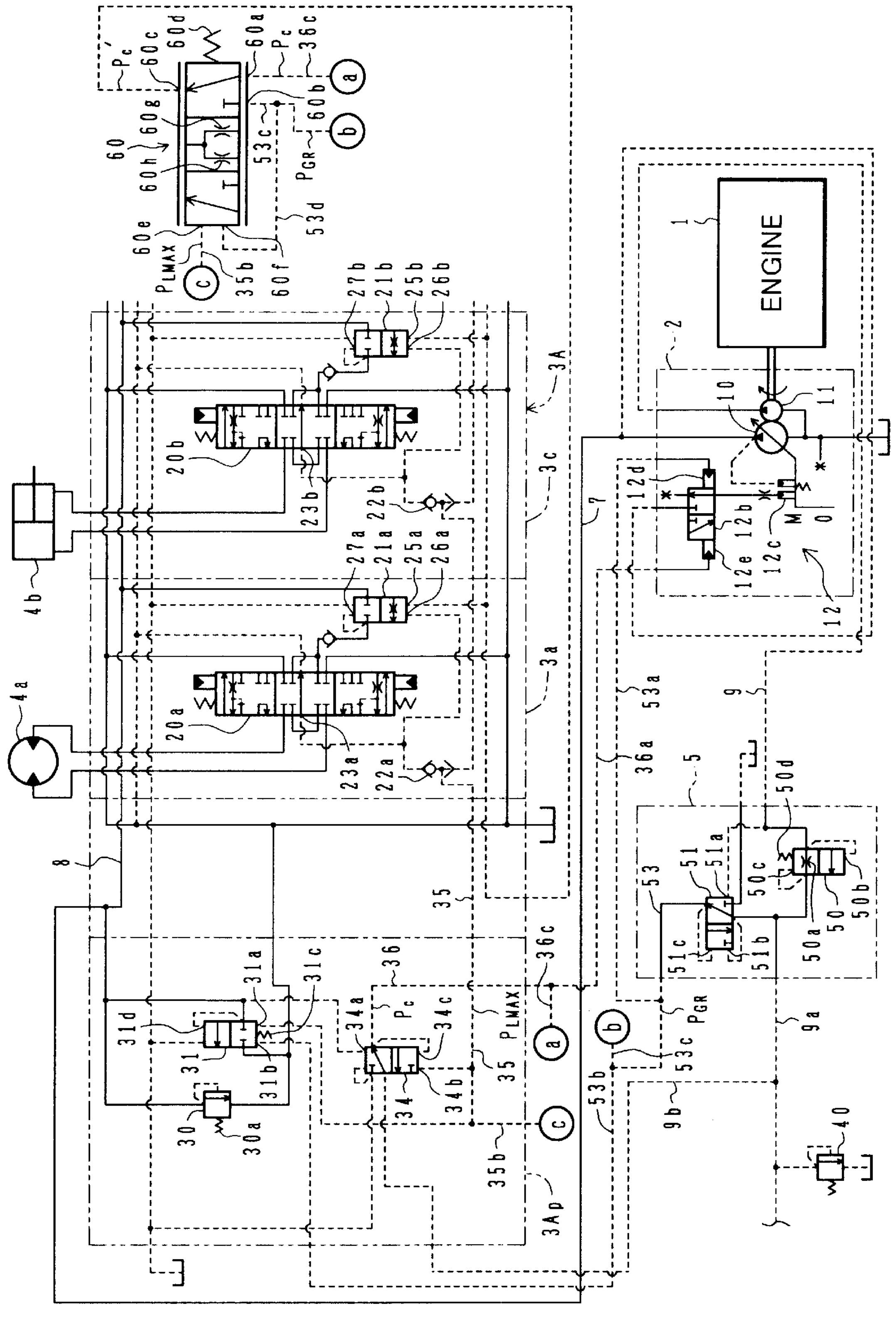
FIG. 12 is a hydraulic circuit diagram showing a hydraulic drive system according to a second embodiment of the present invention.

Referring to FIG. 12, a hydraulic drive system of this embodiment includes a valve apparatus 3A. In a valve section 3Ap of the valve apparatus 3A, the fixed throttle 32 and the signal pressure variable relief valve 33 shown in FIG. 1 are not provided, and the maximum load pressure detected by the maximum load pressure line 35 is directly introduced to the pressure control valve 34. Further, the system of this embodiment includes a selector valve 60 capable of selecting one of the output pressure of the pressure control valve 34 and the output pressure of the pressure control valve 51, i.e., the target LS differential pressure. An output pressure of the selector valve 60 is introduced to the pressure receiving sections 25*a*, 25*b*, . . . of the pressure compensating valves 21*a*, 21*b*, . . . for setting the target compensated differential pressure.

The selector valve 60 has two input ports 60*a*, 60*b* and one output port 60*c*. The output pressure of the pressure control valve 34 is introduced to the input port 60*a* via the signal pressure line 36 and a signal pressure line 36*c* branched from it. The output pressure of the pressure control valve 51, i.e., the target LS differential pressure, is introduced to the input port 60*b* via the signal pressure line 53*b* and a signal pressure line 53*c* branched from it. The output port 60*c* is connected to the pressure receiving sections 25*a*, 25*b*, . . . of the pressure compensating valves 21*a*, 21*b*, . . . via a signal pressure line 61 so that the output pressure of the selector valve 60 is introduced to the pressure receiving sections 25*a*, 25*b*, . . . .

Also, the selector valve 60 has a spring 60*d* operating in the direction to select the first input port 60*a*, and pressure receiving sections 60*e*, 60*f* operating in the direction to select the second input port 60*b*. The maximum load pressure is introduced to the pressure receiving section 60*e* via the maximum load pressure line 35 and a signal pressure line 35*b* branched from it. The output pressure of the pressure control valve 51, i.e., the target LS differential pressure, is introduced to the pressure receiving section 60*f* via a signal pressure line 53*d* branched from the signal pressure line 53*c*. The spring 60*d* is set to have the strength that provides the same value in terms of pressure as the setting pressure of the main relief valve 30, i.e., the same strength as the spring 30*a* of the main relief valve 30.

Further, the selector valve 60 has variable throttles 60*g*, 60*h* for varying pressure in a smooth and continuous manner when the selector valve 60 is shifted from a position where the pressure at the first input port 60*a* is selected as shown, to a position where the pressure at the second input port 60*b* is selected.

Figure 13:
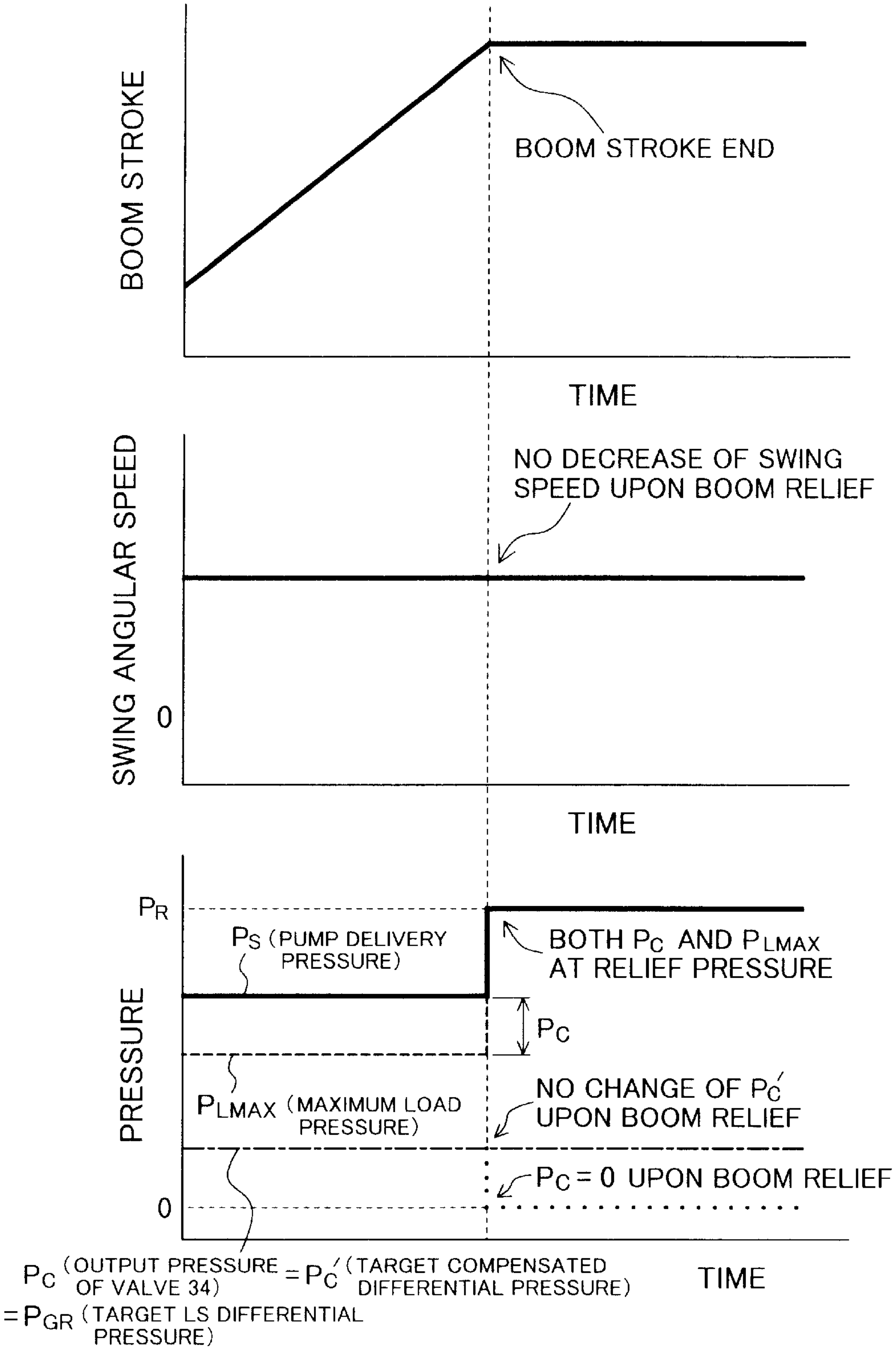
FIG. 13 is a chart showing changes over time of a boom stroke, a swing angular speed, a pump delivery pressure, a signal pressure, and a target compensated differential pressure resulting when the combined operation of boom raising and swing in a second embodiment of the present invention at the rated engine revolution speed.
Figure 14:
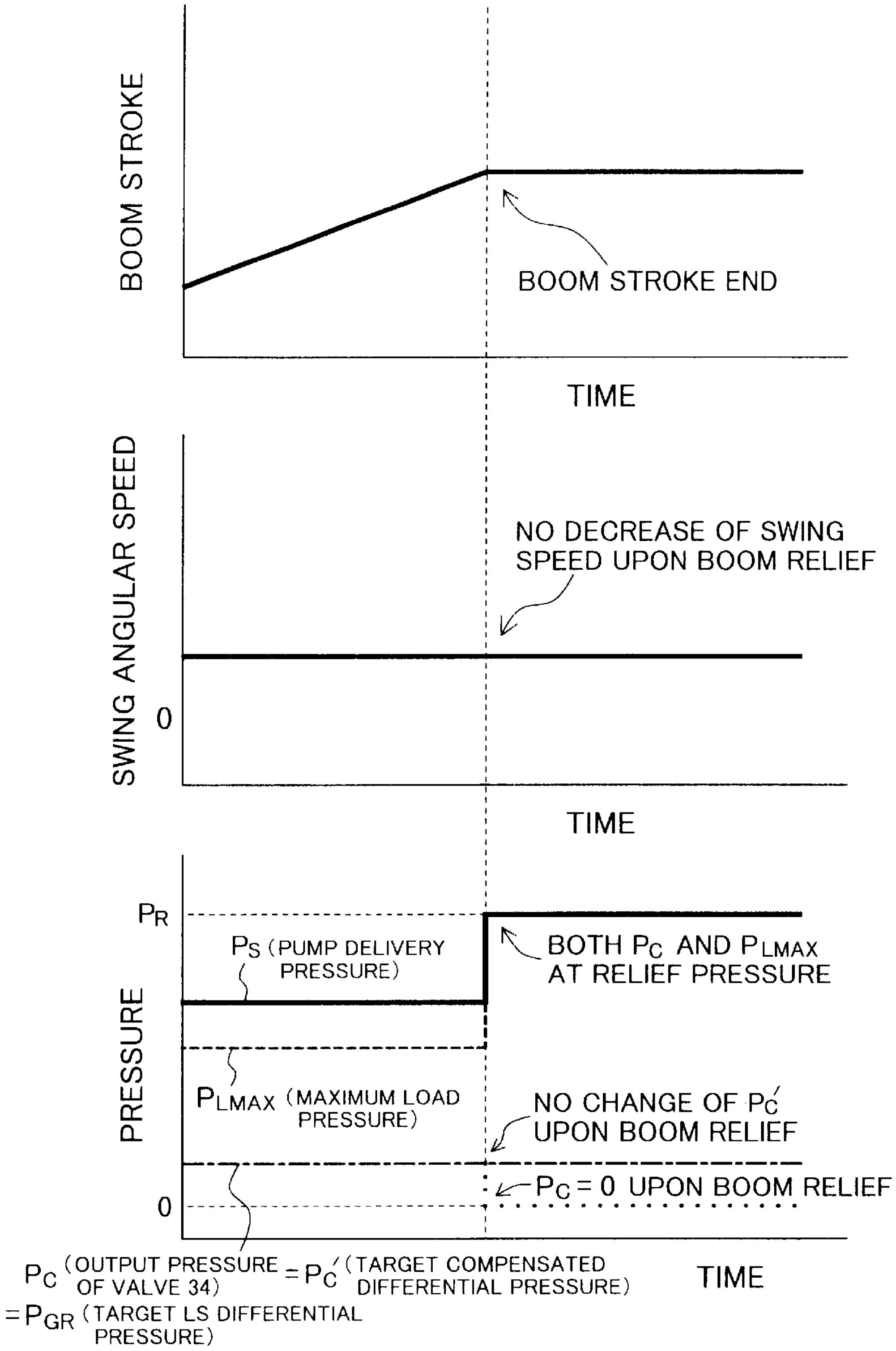
FIG. 14 is a chart showing changes over time of a boom stroke, a swing angular speed; a pump delivery pressure, a signal pressure, and a target compensated differential pressure resulting when the combined operation of boom raising and swing is performed in the second embodiment of the present invention at an engine revolution speed set lower than the rated value.

FIG. 13 is a chart showing changes over time of the same status variables as shown in FIG. 10 resulting when the combined operation of boom raising and swing is performed in the system of this embodiment at an engine revolution speed set to the rated value. FIG. 14 is a chart showing changes over time of the same status variables as shown in FIG. 11 resulting when the combined operation of boom raising and swing is performed in the system of this embodiment at an engine revolution speed set lower than the rated value.

Referring to FIG. 13, in the boom-raising operation before the main relief valve 30 is operated for relief, the selector valve 60 is in the position as shown, and the output pressure Pc of the pressure control valve 34 is selected as an output pressure Pc' of the selector valve 60 and then set as the target compensated differential pressure of the pressure compensating valves 21*a*, 21*b*, . . . . Also, the pump delivery pressure Ps is held higher than the maximum load pressure $P_{LMAX}$ by the target LS differential pressure $P_{GR}$. Therefore, a target compensated differential pressure Pc' of the pressure compensating valves 21*a*, 21*b*, . . . set by the output pressure of the pressure control valve 34 is equal to the target LS differential pressure $P_{GR}$ ($Pc'=P_{GR}$).

When the boom cylinder 4*b* reaches the stroke end and the main relief valve 30 is operated for relief, the selector valve 60 is shifted, whereupon the target LS differential pressure $P_{GR}$ given by the output pressure of the pressure control valve 53 is selected as an output pressure Pc' of the selector valve 60 and then set as the target compensated differential pressure of the pressure compensating valves 21*a*, 21*b*, . . . ($Pc'=P_{GR}$). The output pressure Pc of the pressure control valve 34 at this time is Pc=0.

As a result, even when the boom cylinder 4*b* reaches the stroke end and the main relief valve 30 is operated for relief, the swing is not stopped and the operability in the combined operation is maintained.

The system of this embodiment operates likewise also when the engine revolution speed is set to a level lower than the rated value. More specifically, referring to FIG. 14, in the boom-raising operation before the main relief valve 30 is operated for relief, the output pressure Pc(=Pc') of the pressure control valve 34 is set as the target compensated differential pressure of the pressure compensating valves 21*a*, 21*b*, . . . , and this target compensated differential pressure Pc' is equal to the target LS differential pressure $P_{GR}$ ($Pc'=P_{GR}$). When the boom cylinder 4*b* reaches the stroke end, the target LS differential pressure $P_{GR}$ given by the output pressure of the pressure control valve 53 is set as the target compensated differential pressure of the pressure compensating valves 21*a*, 21*b*, . . . ($Pc'=P_{GR}$). The output pressure Pc of the pressure control valve 34 at this time is Pc=0. In this case, however, since the target LS differential pressure $P_{GR}$ is lower than that when the engine revolution speed is set to the rated value, the target compensated differential pressure Pc' of the pressure compensating valves 21*a*, 21*b*, . . . is maintained at a level lower than when the engine revolution speed is set to the rated value.

As a result, even when the boom cylinder 4*b* reaches the stroke end and the main relief valve 30 is operated for relief, the swing is not stopped and the operability in the combined operation is maintained with no increase of the swing angular speed.

Furthermore, the output pressure Pc(=0) of the pressure control valve 34 is supplied to the LS control valve 12*b* of the LS/horsepower control regulator 12, and the pump delivery rate is controlled so as to maximize within the range of horsepower control flow rate provided by the horsepower control tilting actuator 12*a*.

Accordingly, this embodiment can also provide similar advantages as those in the first embodiment. In addition, with this embodiment, the speeds of the other actuators are avoided from lowering upon relief through the main relief valve 30, and the LS control valve 12*b* of the horsepower control regulator 12 can be operated with stability.

Figure 15:
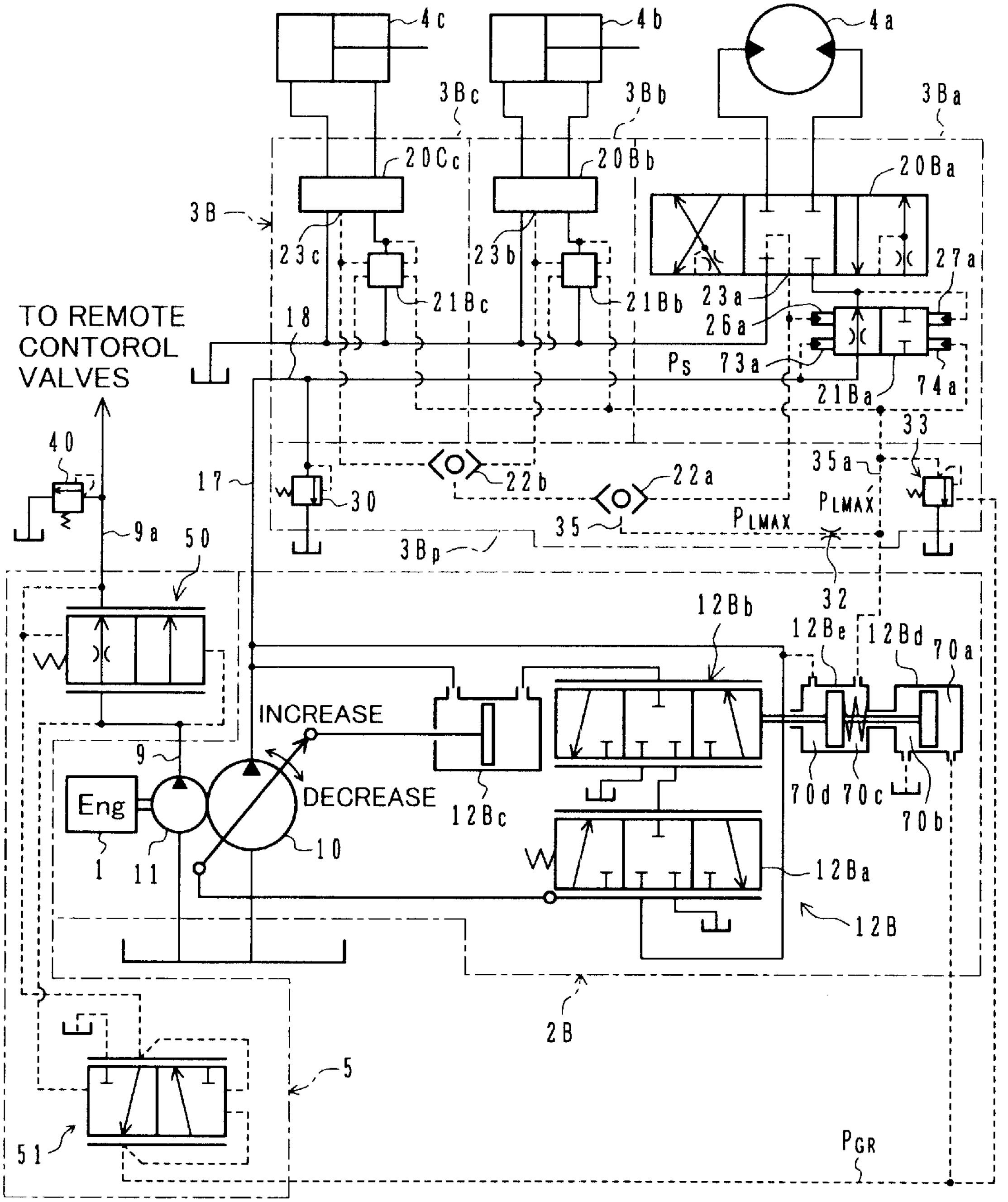
FIG. 15 is a hydraulic circuit diagram showing a hydraulic drive system according to a third embodiment of the present invention.

A third embodiment of the present invention will be described with reference to FIG. 15. In FIG. 15, identical members to those shown in FIG. 1 are denoted by the same reference numerals. While, in the first and second embodiments, the differential pressure between the pump delivery pressure and the maximum load pressure is generated as an absolute pressure by the pressure control valve 34 and introduced to the pressure compensating valves and the LS control valve, the pump delivery pressure and the maximum load pressure are separately introduced as they are in this embodiment.

Referring to FIG. 15, a hydraulic drive system of this embodiment includes a hydraulic source 2B and a valve apparatus 3B. The hydraulic source 2B and the valve apparatus 3B have constructions different from those in the first embodiment.

More specifically, the hydraulic source 2B includes an LS/horsepower control regulator 12B for controlling the tilting (displacement) of the hydraulic pump 10. The LS/horsepower control regulator 12B comprises a horsepower control valve 12Ba, an LS control valve 12Bb, and a servo piston 12Bc. The horsepower control valve 12Ba and the servo piston 12Bc cooperatively perform horsepower control for decreasing the tilting of the hydraulic pump 10, while the LS control valve 12Bb and the servo piston 12Bc cooperatively perform load sensing control for holding the delivery pressure of the hydraulic pump 10 to be higher than the maximum load pressure of a plurality of actuators 4*a*, 4*b*, 4*c* by the target differential pressure.

The LS control valve 12Bb includes a first operation drive unit 12Bd and a second operation drive unit 12Be which are each of the piston type and are disposed at an end of the LS control valve 12Bb on the side acting to raise a pressure in a bottom-side chamber of the servo piston 12Bc and to increase the tilting of the hydraulic pump 10. The first operation drive unit 12Bd has a pressure bearing section 70*a* on the side acting to increase the tilting and a pressure bearing section 70*b* on the side acting to decrease the tilting. The target differential pressure for the load sensing control (target LS differential pressure), given as the output pressure of the pressure control valve 51 of the target LS differential pressure generating circuit 5, is introduced to the pressure bearing section 70*a* on the side acting to increase the tilting, and the pressure bearing section 70*b* on the side acting to decrease the tilting is communicated with a reservoir. The second operation drive unit 12Be has a pressure bearing section 70*c* on the side acting to decrease the tilting and a pressure bearing section 70*d* on the side acting to increase the tilting. The delivery pressure of the hydraulic pump 10 is introduced to the pressure bearing section 70*c* on the side acting to decrease the tilting, and the pressure in the signal pressure line 35*a* (usually the maximum load pressure) is introduced to the pressure bearing section 70*d* on the side acting to increase the tilting.

The valve apparatus 3B includes valve sections 3Ba, 3Bb, 3Bc corresponding respectively to the actuators 4*a*, 4*b*, 4*c*, and another valve section 3Bp. A plurality of closed center directional control valves 20Ba, 20Bb, 20Bc and a plurality of pressure compensating valves 21Ba, 21Bb, 12Bc are disposed respectively in the valve sections 3Ba, 3Bb, 3Bc, whereas shuttle valves 22*a*, 22*b* constituting a part of a maximum load pressure detecting circuit, a main relief valve 30, a fixed throttle 32, and a signal pressure variable relief valve 33 are disposed in the valve section 3Bp. The aforesaid pressure control valve 34 used in the first and second embodiments are not disposed in the valve section 3Bp. Additionally, a variable unloading valve is omitted from the drawing.

The pressure compensating valve 21Ba has pressure receiving sections 73*a*, 26*a* operating in the opening direction, and pressure receiving sections 27*a*, 74*a* operating in the closing direction. As with the first embodiment, the load pressure of the actuator 4*a* (pressure downstream of a meter-in throttle of the directional control valve 20Ba) and a pressure upstream of the meter-in throttles of the directional control valve 20Ba are introduced to the pressure receiving section 26*a*, 27*a*, respectively. On the other hand, the delivery pressure of the hydraulic pump 10 is introduced to the pressure receiving section 73*a*, and the pressure in the signal pressure line 35*a* (usually the maximum load pressure) is introduced to the pressure receiving section 74*a*. The pressure compensating valves 21Bb, 21Bc are also similarly constructed.

In the maximum load pressure line 35, as with the first embodiment, the fixed throttle 32 and the signal pressure relief valve 33 are disposed. A setting pressure of the signal pressure relief valve 33 is set to be lower than a setting pressure of the main relief valve 30, and the signal pressure relief valve 33 is constructed as a variable relief valve, of which setting pressure varies depending on the target LS differential pressure that changes with the engine revolution speed.

This embodiment having the above-described construction is essentially the same as the first embodiment except that the pump delivery pressure and the maximum load pressure are separately introduced, as they are, to the second operation drive unit 12Be of the LS control valve 12Bb and the pressure compensating valves 21Ba, 21Bb, 21Bc instead of generating the differential pressure (absolute pressure) between the pump delivery pressure and the pressure in the signal pressure line 35*a* (usually the maximum load pressure) by the pressure control valve 34 and then introducing the generated differential pressure to those components. Hence, with the operation of the fixed throttle 32 and the signal pressure variable relief valve 33, this embodiment can also provide similar advantages as those in the first embodiment.

Figure 16:
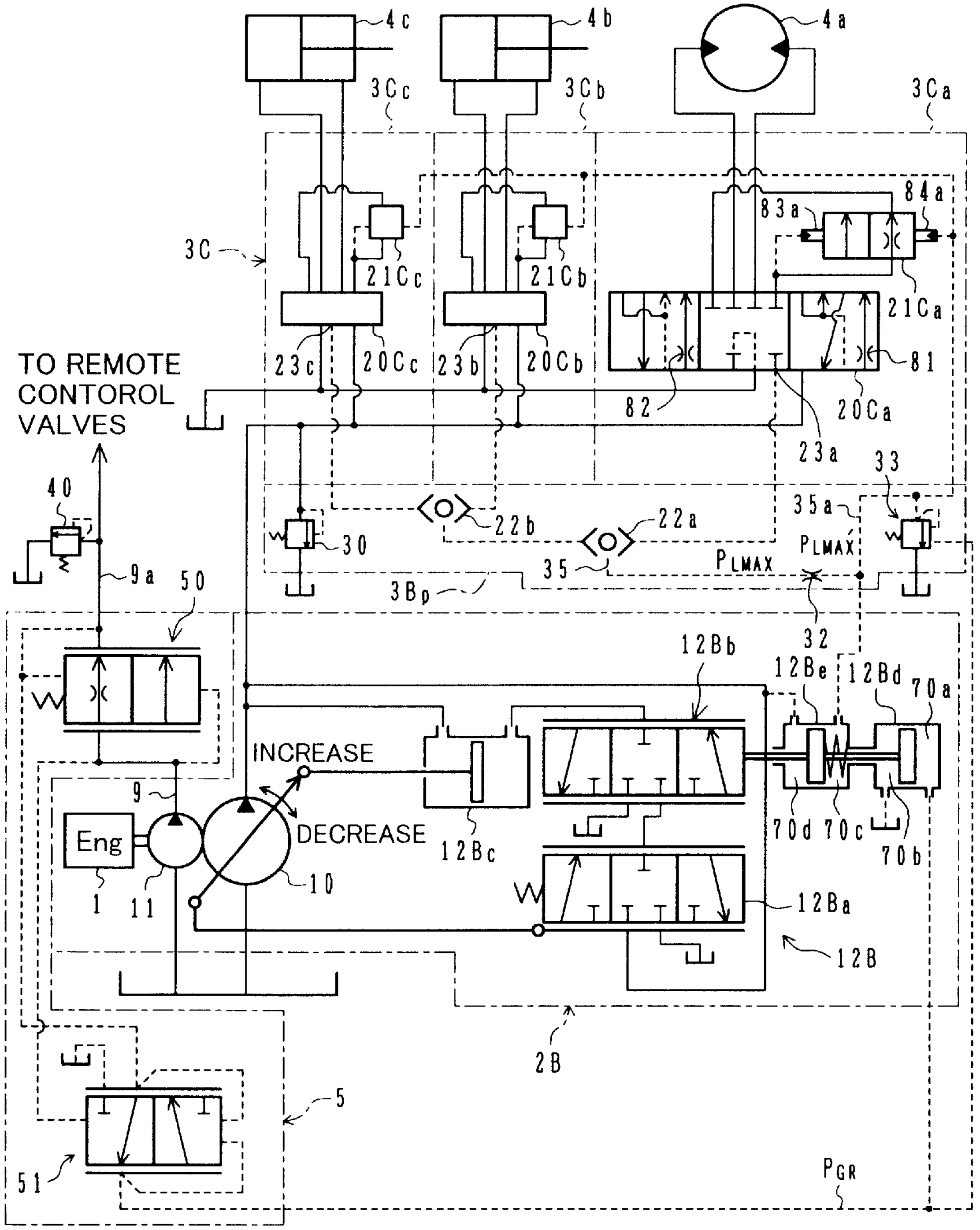
FIG. 16 is a hydraulic circuit diagram showing a hydraulic drive system according to a fourth embodiment of the present invention.

A fourth embodiment of the present invention will be described with reference to FIG. 16. In FIG. 16, identical members to those shown in FIGS. 1 and 15 are denoted by the same reference numerals. While, in the first to third embodiments, the pressure compensating valve is of the before orifice type wherein it is disposed upstream of the meter-in throttle of the directional control valve, this embodiment employs a pressure compensating valve of the after orifice type wherein it is disposed downstream of the meter-in throttle of the directional control valve.

Referring to FIG. 16, a hydraulic drive system of this embodiment includes a valve apparatus 3C. The valve apparatus 3C has a construction different from that in the first embodiment.

The valve apparatus 3C includes valve sections 3Ca, 3Cb, 3Cc corresponding respectively to the actuators 4*a*, 4*b*, 4*c*, and another valve section 3Bp. A plurality of closed center directional control valves 20Ca, 20Cb, 20Cc and a plurality of pressure compensating valves 21Ca, 21Cb, 21Cc are disposed respectively in the valve sections 3Ca, 3Cb, 3Cc, whereas shuttle valves 22*a*, 22*b* constituting a part of a maximum load pressure detecting circuit, a main relief valve 30, a fixed throttle 32, and a signal pressure variable relief valve 33 are disposed in the valve section 3Bp.

The pressure compensating valve 21Ca is positioned downstream of meter-in throttles 81, 82 of a directional control valve 20Ca, and has a pressure receiving section 83a operating in the opening direction and a pressure receiving section 84*a* operating in the closing direction. A pressure downstream of the meter-in throttle of the directional control valve 20Ca is introduced to the pressure receiving section 83*a,* and the pressure in the signal pressure line 35*a* (usually the maximum load pressure) is introduced to the pressure receiving section 84*a*. The pressure compensating valves 21Cb, 21Cc are also similarly constructed.

In the case of employing the pressure compensating valves 21Ca, 21Cb, 12Cc of the after orifice type like this embodiment, the pressures downstream of the meter-in throttles of the directional control valves 20Ca, 20Cb, 20Cc are all controlled to a level substantially equal to the pressure in the signal pressure line 35*a* during the combined operation in which the actuators 4*a*, 4*b*, 4*c* are simultaneously driven. As a result, differential pressures across the meter-in throttles of the directional control valves 20Ca, 20Cb, 20Cc are also controlled substantially in a similar manner. Thus, as with the case of employing the pressure compensating valves 21Ca, 21Cb, 12Cc of the before orifice type, the hydraulic fluid can be supplied at a ratio depending on opening areas of the meter-in throttles of the directional control valves 20Ca, 20Cb, 20Cc regardless of the magnitudes of load pressures and in the event of a saturation state where the delivery rate of the hydraulic pump 10 is insufficient for satisfying a demanded flow rate.

Also in this embodiment, the fixed throttle 32 and the signal pressure relief valve 33 are disposed in the maximum load pressure line 35. A setting pressure of the signal pressure relief valve 33 is set to be lower than a setting pressure of the main relief valve 30, and the signal pressure relief valve 33 is constructed as a variable relief valve, of which setting pressure varies depending on the target LS differential pressure that changes with the engine revolution speed. Therefore, even when the load pressure of any one actuator reaches the setting pressure of the main relief valve 30 during the combined operation in which a plurality of actuators 4*a*, 4*b*, 4*c* are simultaneously driven, the other actuators are neither stopped nor sped up, and good operability in the combined operation is maintained.

Industrial Applicability

According to the present invention, even when a load pressure of any one actuator reaches a setting pressure of a main relief valve during the combined operation in which a plurality of actuators are simultaneously driven, the other actuators are not stopped and good operability in the combined operation can be ensured.

Also, according to the present invention, even when a load pressure of any one actuator reaches a setting pressure of a main relief valve during the combined operation in which a plurality of actuators are simultaneously driven, the other actuators are not sped up and good operability in the combined operation can be ensured.

Simultaneously, a pump LS control system can be held in a stable condition.

What is claimed is:

1. A hydraulic drive system comprising an engine (1), a variable displacement hydraulic pump (10) driven by said engine, a plurality of actuators (4*a*,4*b*) driven by a hydraulic fluid delivered from said hydraulic pump, a plurality of directional control valves (20*a*,20*b*; 20Ba,20Bb; 20Ca, 20Cb) for controlling respective flow rates of the hydraulic fluid supplied from said hydraulic pump to said plurality of actuators, a plurality of pressure compensating valves (21*a*, 21*b*; 21Ba,21Bb; 21Ca,21Cb) for controlling respective differential pressures across said plurality of directional control valves, pump control means (12; 12B) for performing load sensing control to hold a delivery pressure of said hydraulic pump higher than a maximum load pressure of said plurality of actuators by a target differential pressure, and a main relief valve (30) for restricting an upper limit of the delivery pressure of said hydraulic pump, a target compensated differential pressure (Pc) for each of said plurality of pressure compensating valves being set in accordance with a differential pressure (Ps–PLMAX) between the delivery pressure of said hydraulic pump and the maximum load pressure of said plurality of actuators, a target differential pressure (PGR) in said load sensing control being set as a variable value depending on a revolution speed of said engine, wherein:

said hydraulic drive system further comprises target compensated differential pressure modifying means (32,33; 60) for setting, as the target compensated differential pressure (Pc) for each of said plurality of pressure compensating valves (21*a*,21*b*; 21Ba,21Bb; 21Ca, 21Cb), a modification value (PGR–α; PGR) different from the differential pressure between the delivery pressure of said hydraulic pump and the maximum load pressure of said plurality of actuators (4*a*,4*b*), when the delivery pressure of said hydraulic pump (10) rises up to a setting pressure of said main relief valve (30).

2. A hydraulic drive system according to claim 1, wherein said modification value (PGR–α; PGR) is a variable value depending on the revolution speed of said engine (1).

3. A hydraulic drive system according to claim 1, wherein said modification value (PGR–α; PGR) is equal to or smaller than the target differential pressure (PGR) In said load sensing control set as a variable value depending on the revolution speed of said engine (1).

4. A hydraulic drive system according to claim 1, wherein said target compensated differential pressure modifying means (32,33) includes a signal pressure relief valve (33) which is provided in a maximum load pressure line (35,35*a*) for detecting the maximum load pressure, and which reduces an upper limit of the maximum load pressure detected by said maximum load pressure line to be lower than the setting pressure of said main relief valve (30) by said modification value (PGR–α).

5. A hydraulic drive system according to claim 4, wherein said signal pressure relief valve (33) is a variable relief valve, and assuming a relief setting pressure of said variable relief valve to be $P_{LMAX0}$, the target differential pressure in said load sensing control to be $P_{GR}$, and the setting pressure of said main relief valve to be $P_R$, the relief setting pressure $P_{LMAX0}$ of the variable relief valve is set so as to satisfy:

$$P_{LMAX0}=P_R-P_{GR}+\alpha$$

(where α is a value smaller than $P_{GR}$).

6. A hydraulic drive system according to claim 1, wherein said target compensated differential pressure modifying means (60) includes a selector valve (60) for changing over the target compensated differential pressure (Pc) from the differential pressure (Ps—PLMAX) between the delivery pressure of said hydraulic pump and the maximum load pressure of said plurality of actuators (4*a*, 4*b*) to the target differential pressure (PGR) in said load sensing control, immediately before the delivery pressure of said hydraulic pump (10) rises up to the setting pressure (PR) of said main relief valve (30).

* * * * *